(12) United States Patent
Suda

(10) Patent No.: US 11,681,498 B2
(45) Date of Patent: Jun. 20, 2023

(54) NEURAL NETWORK ARITHMETIC PROCESSING DEVICE AND NEURAL NETWORK ARITHMETIC PROCESSING METHOD

(71) Applicant: TDK CORPORATION, Tokyo (JP)

(72) Inventor: Keita Suda, Tokyo (JP)

(73) Assignee: TDK CORPORATION, Tokyo (JP)

( * ) Notice: Subject to any disclaimer, the term of this patent is extended or adjusted under 35 U.S.C. 154(b) by 354 days.

(21) Appl. No.: 16/819,303

(22) Filed: Mar. 16, 2020

(65) Prior Publication Data

US 2020/0349419 A1 Nov. 5, 2020

(30) Foreign Application Priority Data

Mar. 27, 2019 (WO) ................. PCT/JP2019/013327

(51) Int. Cl.
*G06F 7/544* (2006.01)
*G06F 7/523* (2006.01)
*G06F 7/50* (2006.01)

(52) U.S. Cl.
CPC .............. *G06F 7/5443* (2013.01); *G06F 7/50* (2013.01); *G06F 7/523* (2013.01)

(58) Field of Classification Search
CPC ............ G06F 17/15–153; G06F 17/16; G06F 7/5443; G06F 9/3893; G06F 2207/4824
See application file for complete search history.

(56) References Cited

U.S. PATENT DOCUMENTS

| | | | | |
|---|---|---|---|---|
| 5,216,751 A | * | 6/1993 | Gardner | G06N 3/063 |
| | | | | 706/42 |
| 5,904,731 A | * | 5/1999 | Matsui | G06F 7/5443 |
| | | | | 708/319 |
| 2010/0122071 A1 | | 5/2010 | Yoshikawa et al. | |
| 2017/0116495 A1 | * | 4/2017 | Nomura | G06V 10/955 |
| 2020/0076435 A1 | * | 3/2020 | Wang | G06F 7/5443 |

FOREIGN PATENT DOCUMENTS

| | | |
|---|---|---|
| JP | H05-346914 A | 12/1993 |
| JP | H10-187648 A | 7/1998 |
| JP | 2001-067338 A | 3/2001 |
| JP | 2002-215386 A | 8/2002 |
| JP | 2010-117806 A | 5/2010 |
| JP | 2017-079017 A | 4/2017 |

* cited by examiner

*Primary Examiner* — Matthew D Sandifer
(74) *Attorney, Agent, or Firm* — Oliff PLC

(57) ABSTRACT

A neural network arithmetic processing device is capable of implementing a further increase in speed and efficiency of multiply-accumulate arithmetic operation, suppressing an increase in circuit scale, and performing multiply-accumulate arithmetic operation with simple design. A neural network arithmetic processing device includes a first multiply-accumulate arithmetic unit, a register connected to the first multiply-accumulate arithmetic unit, and a second multiply-accumulate arithmetic unit connected to the register. The first multiply-accumulate arithmetic unit has a first memory, a second memory, a first multiplier, a first adder, and a first output unit. The second multiply-accumulate arithmetic unit has an input unit, a third memory, second multipliers, second adders, and second output units.

12 Claims, 14 Drawing Sheets

NEURAL NETWORK ARITHMETIC PROCESSING DEVICE AND NEURAL NETWORK ARITHMETIC PROCESSING METHOD

TECHNICAL FIELD OF THE INVENTION

The present invention relates to a neural network arithmetic processing device and a neural network arithmetic processing method, and in particular, to a neural network arithmetic processing device that performs a multiply-accumulate arithmetic operation of a neural network in a digital manner.

Priority is claimed on Japanese Patent Application No. PCT/JP2019/013327, filed on Mar. 27, 2019, the content of which is incorporated herein by reference.

RELATED ART

A neural network has been put into practical use for an identification technique and a classification technique of advanced information including deep learning in a wide range of fields, such as financing, marketing, authentication, and security. In the techniques described above, since a large amount of multiply-accumulate arithmetic operation is needed with high functionality or the like, an increase in speed and efficiency of a multiply-accumulate arithmetic operation becomes important.

In general, the neural network has higher performance as the number of layers of the neural network is greater. However, an increase in the number of layers causes not only an increase in circuit scale but also an increase in number of arithmetic operations, and a lot of arithmetic operation time is needed. Thus, there is a need to constitute a device in view of both of improvement of an arithmetic function and performance.

In the related art, a neuro processor including a matrix arithmetic device that executes switching of combinations of a multiplier, an adder, a memory, a register, and the like by a selector, and has a memory and an adder attached to each column and each row of a plurality of processor elements (PE) arranged in a two-dimensional manner, and an auxiliary arithmetic device that is operable in parallel with the matrix arithmetic device and performs computation other than matrix computation has been suggested (Patent Document 1). In the configuration, it is possible to efficiently and flexibly perform the matrix computation allocated to each processor element, and to process a large number of arithmetic operations fast by performing the computation other than the matrix computation in parallel by the auxiliary arithmetic device separately provided.

PRIOR ART DOCUMENT

Patent Document

[Patent Document 1] Japanese Unexamined Patent Application, First Publication No. H05-346914

DISCLOSURE OF THE INVENTION

Problems to be Solved by the Invention

However, in the technique described above, while parallelization of arithmetic processing within one layer enables a fast arithmetic operation, in a case where an arithmetic function is applied at the next stage, the neural network is inefficient as a whole, and an increase in speed and efficiency of the multiply-accumulate arithmetic operation is not sufficient.

In general, as a method of implementing an increase in speed and efficiency of the multiply-accumulate arithmetic operation, a method of parallelizing or pipelining the arithmetic processing is known. Since the number of layers changes depending on a processing target, from a viewpoint of versatility or the like, there are many methods in which an arithmetic function is completed in one layer and the arithmetic function is also applied at the next stage.

For example, as simple arithmetic processing, a series of operations to read two variables, add the two variables, and write a value of the addition to a memory is repeatedly performed three times. In a case of a normal arithmetic operation, since an input of a function is read for every three clocks and a value of addition is output after two cycles, a time needed for the whole arithmetic processing becomes three clocks×three (times)=nine clocks.

In a case where the arithmetic processing is parallelized, the arithmetic processing can be completed at three clocks shorter than nine clocks; however, a circuit that can read and write a plurality of pieces of data simultaneously should be provided, and the same number of arithmetic units as the number of parallelized arithmetic processing is needed, causing an increase in circuit scale.

In a case where the arithmetic processing is pipelined, since the series of operations is sequentially performed at a timing delayed for three clocks using a register between the layers, it is possible to complete the arithmetic processing in a shorter time than nine clocks and to execute the arithmetic processing by one arithmetic unit, thereby suppressing an increase in circuit scale. However, in order to implement a further increase in speed, temporal thorough design is needed and becomes complicated. In an arithmetic operation of an actual neural network, a large number of arithmetic operations is performed. For this reason, there is a need to design a circuit to implement a fast arithmetic operation while efficiently combining parallelization or pipelining and suppressing a circuit scale; however, this merely increases efficiency within a layer, and is not sufficient.

An object of the invention is to provide a neural network arithmetic processing device and a neural network arithmetic processing method capable of implement a further increase in speed and efficiency of a multiply-accumulate arithmetic operation, suppressing an increase in circuit scale, and performing the multiply-accumulate arithmetic operation with simple design.

Means for Solving the Problem

In order to achieve the above-described object, the invention provides the following means.

[1] A neural network arithmetic processing device includes at least one first multiply-accumulate arithmetic unit; at least one register connected to the at least one first multiply-accumulate arithmetic unit; and at least one second multiply-accumulate arithmetic unit connected to the at least one register, in which the first multiply-accumulate arithmetic unit has a first memory that stores a plurality of first input variables, a second memory that stores a plurality of pieces of first weight data, at least one first multiplier that calculates a plurality of products of the first input variables and the first weight data, at least one first adder that calculates a plurality of sums of the products multiplied by the at least one first multiplier, and at least one first output unit that outputs the plurality of sums added by the at least one first adder to the register as a plurality of second input variables, and the second multiply-accumulate arithmetic unit has a third memory that stores a plurality of pieces of second weight data, at least one second multiplier that calculates a plurality of products of the second weight data and the second input variables held in the registers, at least one second adder that calculates a plurality of sums of the products multiplied by the at least one second multiplier, and at least one second output unit that outputs the plurality of sums added by the at least one second adder as a plurality of output values.

[2] The neural network arithmetic processing device described in [1], in which at least part of arithmetic processing to be executed by the second multiply-accumulate arithmetic units is executed in parallel with arithmetic processing to be executed by the first multiply-accumulate arithmetic units.

[3] The neural network arithmetic processing device described in [2], in which, in a case where the number of arithmetic operations constituting arithmetic processing P1 to be executed by the first multiply-accumulate arithmetic unit 10 is (n+1) (where n is an integer equal to or greater than 0), and the number of arithmetic operations constituting arithmetic processing P2 to be executed by the second multiply-accumulate arithmetic unit is (q+1) (where q is an integer equal to or greater than 0), the number of parallel arithmetic processing L1 of the arithmetic processing P1 to be executed by the first multiply-accumulate arithmetic unit is a divisor of the number of arithmetic operations (n+1), and the number of parallel arithmetic processing L2 of the arithmetic processing P2 to be executed by the second multiply-accumulate arithmetic unit is a divisor of the number of arithmetic operations (q+1).

[4] The neural network arithmetic processing device described in [3], in which both of the number of pipelines C1 constituting the arithmetic processing P1 and the number of pipelines C2 constituting the arithmetic processing P2 are a common divisor of the number of arithmetic operations (n+1) and the number of arithmetic operations (q+1).

[5] The neural network arithmetic processing device described in [4], in which both of the number of pipelines C1 constituting the arithmetic processing P1 and the number of pipelines C2 constituting the arithmetic processing P2 are a greatest common divisor of the number of arithmetic operations (n+1) and the number of arithmetic operations (q+1).

[6] The neural network arithmetic processing device described in any one of [3] to [5], in which a timing at which the arithmetic processing to be executed by the second multiply-accumulate arithmetic unit ends is the same as a timing at which the arithmetic processing to be executed by the first multiply-accumulate arithmetic unit ends.

[7] The neural network arithmetic processing device described in [1], in which each of the second memory and the third memory is a ring buffer memory.

[8] The neural network arithmetic processing device described in [1], further including: at least one activation function arithmetic processing unit that is provided at least either between the first multiply-accumulate arithmetic unit and the register or between the register and the second multiply-accumulate arithmetic unit to perform an arithmetic operation using an activation function.

[9] The neural network arithmetic processing device described in any one of [2] to [8], in which the at least one first multiplier is a plurality of first multipliers, and the at least one first adder is a plurality of first adders.

The neural network arithmetic processing device described in any one of [2] to [9], in which the at least one second multiply-accumulate arithmetic unit is a plurality of the second multiply-accumulate arithmetic units, and the plurality of the second multiply-accumulate arithmetic units operate in parallel with the at least one first multiply-accumulate arithmetic unit.

The neural network arithmetic processing device according to any one of [2] to [9], in which the at least one first multiply-accumulate arithmetic unit is a plurality of the first multiply-accumulate arithmetic units, and the plurality of the first multiply-accumulate arithmetic units operate in parallel with the at least one second multiply-accumulate arithmetic unit.

The neural network arithmetic processing device described in any one of [2] to [9], in which the at least one first multiply-accumulate arithmetic unit is a plurality of the first multiply-accumulate arithmetic units, the at least one second multiply-accumulate arithmetic unit is a plurality of the second multiply-accumulate arithmetic units, and the plurality of the first multiply-accumulate arithmetic units operate in parallel with the plurality of the second multiply-accumulate arithmetic units.

A neural network arithmetic processing method including: a first arithmetic step of calculating a plurality of products of first input variables and first weight data and calculating a plurality of sums of the products; a holding step of holding the plurality of sums calculated in the first arithmetic step as a plurality of second input variables; a second arithmetic step of calculating a plurality of products of second weight data and the second input variables and calculating a plurality of sums of the products; and a second output step of outputting the plurality of sums calculated in the second arithmetic step as a plurality of output values, in which at least part of arithmetic processing to be executed in the second arithmetic step is executed in parallel with arithmetic processing to be executed in the first arithmetic step.

Advantageous Effects of the Invention

According to the invention, it is possible to provide a neural network arithmetic processing device and a neural network arithmetic processing method capable of implementing a further increase in speed and efficiency of a multiply-accumulate arithmetic operation, suppressing an increase in circuit scale, and performing the multiply-accumulate arithmetic operation with simple design.

BRIEF DESCRIPTION OF THE DRAWINGS

FIG. 9(b) is a diagram showing a modification example of a time chart of the arithmetic processing of the first multiply-accumulate arithmetic unit and the arithmetic processing of the second multiply-accumulate arithmetic unit in FIG. 9(a).

EMBODIMENTS OF THE INVENTION

Figure 1:
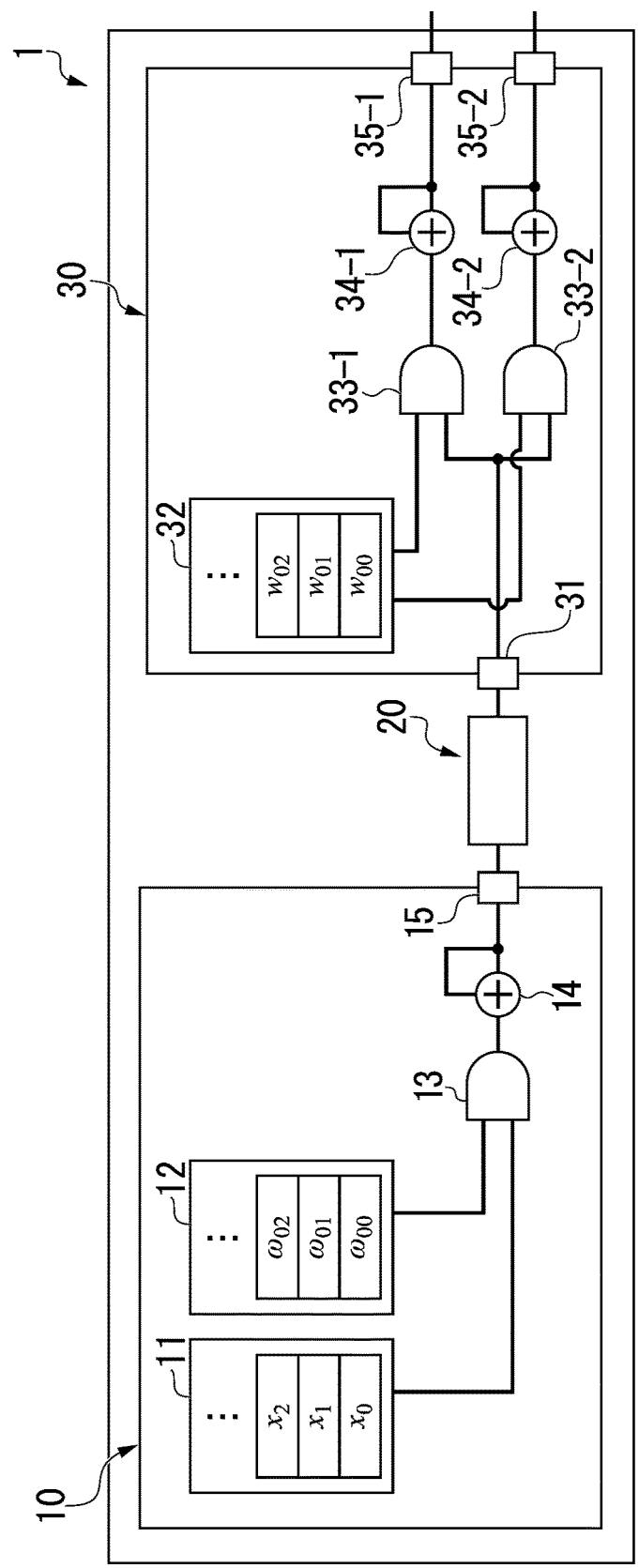
FIG. 1 is a schematic view schematically showing an example of the configuration of a neural network arithmetic processing device according to an embodiment of the invention.

Hereinafter, an embodiment of the invention will be described in detail referring to the drawings.
[Configuration of Neural Network Arithmetic Processing Device]
FIG. 1 is a schematic view schematically showing an example of the configuration of a neural network arithmetic processing device according to an embodiment of the invention.

As shown in FIG. 1, a neural network arithmetic processing device 1 includes a first multiply-accumulate arithmetic unit 10, a register 20 connected to the first multiply-accumulate arithmetic unit 10, and a second multiply-accumulate arithmetic unit 30 connected to the register 20.

The first multiply-accumulate arithmetic unit 10 has a first memory 11 that stores a plurality of first input variables, a second memory 12 that stores a plurality of pieces of first weight data, a first multiplier 13 that calculates a plurality of products of the first input variables and the first weight data, a first adder 14 that calculates a plurality of sums of the products multiplied by the first multiplier 13, and a first output unit 15 that outputs a plurality of sums added by the first adder 14 to the register 20 as a plurality of second input variables. In the embodiment, the first multiply-accumulate arithmetic unit 10 constitutes a digital multiply-accumulate arithmetic circuit.

The first memory 11 stores a plurality of first input variables $x_0, x_1, x_2, \ldots,$ and $x_n$ (where n is an integer equal to or greater than 0), and a plurality of first input variables $x_0, x_1, x_2, \ldots,$ and $x_n$ are read by the first multiply-accumulate arithmetic unit 10. The first memory 11 stores a plurality of first input variables $x_0, x_1, x_2, \ldots,$ and $x_n$, for example, as a matrix A (n-dimensional column vector) with (n+1) rows and one column. The first memory 11 may be constituted of a ring buffer memory. A memory that stores the first input variables does not need random accessibility. For this reason, as the first memory 11 is constituted of a ring buffer memory, the first multiply-accumulate arithmetic unit 10 can be made to have a simple configuration. Other kinds of data than the first input variables can be written to and stored in the first memory 11.

The second memory 12 stores a plurality of pieces of first weight data $\omega_{00}, \omega_{01}, \omega_{02}, \ldots,$ and $\omega_{mn}$ (where m is an integer equal to or greater than 0), and a plurality of pieces of first weight data $\omega_{00}, \omega_{01}, \omega_{02}, \ldots,$ and $\omega_{mn}$ are read by the first multiply-accumulate arithmetic unit 10. The second memory 12 stores a plurality of pieces of first weight data, for example, as a matrix B with (m+1) rows and (n+1) columns. Other kinds of data than the first weight data can be written to and stored in the second memory 12.

The second memory 12 may be constituted of a ring buffer memory. A memory that stores the first weight data does not need random accessibility. For this reason, as the second memory 12 is constituted of a ring buffer memory, the first multiply-accumulate arithmetic unit 10 can be made to have a simple configuration.

In the embodiment, although the first multiply-accumulate arithmetic unit 10 includes the first memory 11 and the second memory 12, the invention is not limited thereto, the first multiply-accumulate arithmetic unit 10 may include one memory that stores a plurality of first input variables and a plurality of pieces of first weight data, instead of the first memory 11 and the second memory 12. As one memory is shared, it is possible to suppress an increase in circuit scale.

The first multiplier 13 has $x_i$ among the first input variables $x_0, x_1, x_2, \ldots,$ and $x_n$ and $\omega_{jk}$ among the first weight data $\omega_{00}, \omega_{01}, \omega_{02}, \ldots,$ and $\omega_{mn}$ as inputs, and outputs a product $\omega_{jk} x_i$. The first multiplier 13 is constituted of a digital multiplier.

The first adder 14 has a plurality of products $\omega_{jk} x_i$ multiplied by the first multiplier 13 as inputs and outputs sums $\Sigma \omega_{jk} x_i$ of a plurality of products $\omega_{jk} x_i$ as second input variables $i_0, i_1, i_2, \ldots,$ and $i_n$, (where m is an integer equal to or greater than 0). The first adder 14 is constituted of a digital adder.

The arithmetic operations of the first multiplier 13 and the first adder 14 can be represented by, for example, a product BA of the matrix B with (m+1) rows and (n+1) columns and the matrix A with (n+1) rows and one column. In this case, a plurality of second input variables $i_0, i_1, i_2, \ldots,$ and $i_n$, output from the first adder 14 are represented as a matrix C with (m+1) rows and one column.

The register 20 holds a plurality of sums output from the first output unit 15 of the first multiply-accumulate arithmetic unit 10 as a plurality of second input variables. The register 20 outputs a plurality of second input variables to the second multiply-accumulate arithmetic unit 30.

The second multiply-accumulate arithmetic unit 30 has an input unit 31 to which a plurality of second input variables output from the register 20 are input, a third memory 32 that stores a plurality of pieces of second weight data, second multipliers 33-1 and 33-2 that calculate products of the second weight data and the second input variables held in the register 20, second adders 34-1 and 34-2 that calculate a plurality of sums of the products multiplied by the second multipliers 33-1 and 33-2, and second output units 35-1 and 35-2 that outputs a plurality of sums added by the second adders 34-1 and 34-2 as a plurality of output values. In the embodiment, similarly to the first multiply-accumulate arithmetic unit 10, the second multiply-accumulate arithmetic unit 30 constitutes a digital multiply-accumulate arithmetic circuit.

The third memory 32 stores a plurality of pieces of second weight data $w_{00}, w_{01}, w_{02}, \ldots,$ and $w_{pq}$ (both of p and q are an integer equal to or greater than 0), and a plurality of pieces of second weight data $w_{00}, w_{01}, w_{02}, \ldots,$ and $w_{pq}$ are read by the second multiply-accumulate arithmetic unit 30. The third memory 32 stores a plurality of pieces of second weight data as a matrix D with (p+1) rows and (q+1) columns. As an example, p=m−1 and q+1=m+1, that is, q=m is established, and a plurality of pieces of second weight data are stored as a matrix D with (p+1) rows and (m+1) columns.

The third memory 32 may be constituted of a ring buffer memory. A memory that stores the second weight data does not need random accessibility. For this reason, as the third memory 32 is constituted of a ring buffer memory, the second multiply-accumulate arithmetic unit 30 can be made to have a simple configuration.

The second multiplier 33-1 has $i_i$ among a plurality of second input variables $i_0, i_1, i_2, \ldots,$ and $i_m$ and $w_{jk}$ among the second weight data $w_{00}, w_{01}, w_{02}, \ldots,$ and $w_{pq}$ as inputs, and outputs a product $w_{jk}i_i$. The second multiplier 33-1 is constituted of a digital multiplier. Since the second multiplier 33-2 also has the same configuration as the second multiplier 33-1, description thereof will not be repeated. In the embodiment, although the second multiply-accumulate arithmetic unit 30 has the two second multipliers 33-1 and 33-2, the invention is not limited thereto, and the second multiply-accumulate arithmetic unit 30 may have one second multiplier.

The second adder 34-1 has a plurality of products $w_{jk}i_i$ multiplied by the second multiplier 33-1 as inputs, and outputs sums $\Sigma w_{jk}i_i$ of a plurality of products $w_{jk}i_i$ as a plurality of output values $y_0, y_1, y_2, \ldots,$ and $y_p$. As an example, p=m−1 and q=m are established, and the sums $\Sigma w_{jk}i_i$ of a plurality of products $w_{jk}i_i$ are output as a plurality of output values $y_0, y_1, y_2, \ldots,$ and $y_{m-1}$ (m is an integer equal to or greater than 0). The second adder 34-1 is constituted of a digital adder. Since the second adder 34-2 also has the same configuration as the second adder 34-1, description thereof will not be repeated. In the embodiment, although the second multiply-accumulate arithmetic unit 30 has the two second adders 34-1 and 34-2, the invention is not limited thereto, and the second multiply-accumulate arithmetic unit 30 may have one second adder.

The second output unit 35-1 outputs a plurality of output values $y_0, y_1, y_2, \ldots,$ and $y_p$ to the outside. Since the second output unit 35-2 has the same configuration as the second output unit 35-1, description thereof will not be repeated. In the embodiment, although the second multiply-accumulate arithmetic unit 30 has the two second output units 35-1 and 35-2, the invention is not limited thereto, and the second multiply-accumulate arithmetic unit 30 may have one second output unit.

The arithmetic operations of the second multipliers 33-1 and 33-2 and the second adders 34-1 and 34-2 can be represented by, for example, a product DC of the matrix D with (p+1) rows and (q+1) columns and the matrix C with (m+1) rows and one column. As an example, p+1=m and q+1=m+1 are established, and the arithmetic operations are represented by a product DC of a matrix D with m rows and (m+1) columns and the matrix C with (m+1) rows and one column. In this case, a plurality of output values $y_0, y_1, y_2, \ldots,$ and $y_{m-1}$ output from the second adders 34-1 and 34-2 are represented as a matrix E with m rows and one column.

In the embodiment, although the second multiply-accumulate arithmetic unit 30 has the two second multipliers 33-1 and 33-2, the second adders 34-1 and 34-2, and the two second output units 35-1 and 35-2, the invention is not limited thereto, the second multiply-accumulate arithmetic unit 30 may have one second multiplier, one second adder, and one second output unit.

FIG. 2(a) is a schematic view showing an example of the configuration of a neural network 40 to which the neural network arithmetic processing device 1 of FIG. 1 is applied.

Figure 2:
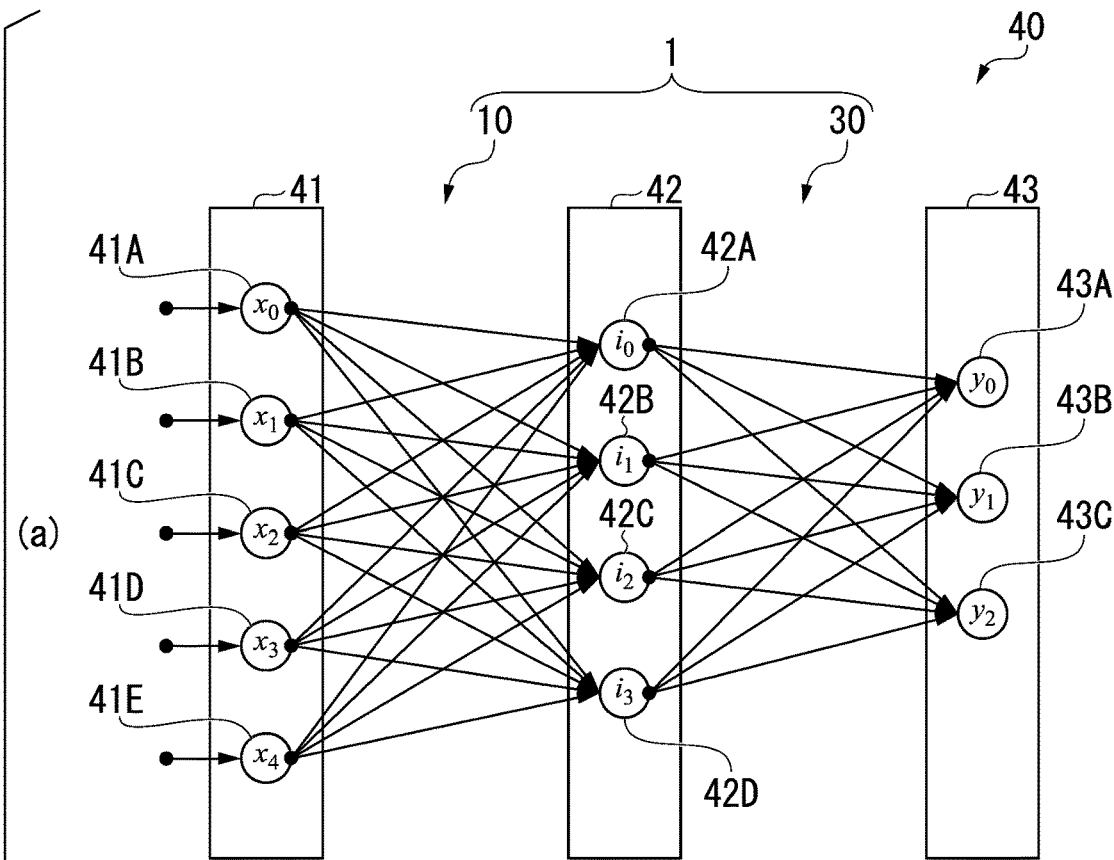
FIG. 2(a) is a schematic view showing an example of the configuration of a neural network to which the neural network arithmetic processing device of FIG. 1 is applied.
FIG. 2(b) is a diagram showing an arithmetic operation of a first multiply-accumulate arithmetic unit of FIG. 2(a)
FIG. 2(c) is a diagram showing an arithmetic operation of a second multiply-accumulate arithmetic unit of FIG. 2(a).

As shown in FIG. 2, the neural network 40 includes an input layer 41, a hidden layer 42 (also referred to as an intermediate layer), an output layer 43, the first multiply-accumulate arithmetic unit 10 that performs an arithmetic operation between the input layer 41 and the hidden layer 42, and the second multiply-accumulate arithmetic unit 30 that performs an arithmetic operation between the hidden layer 42 and the output layer 43.

The input layer 41 includes, for example, five nodes 41A, 41B, 41C, 41D, and 41E. Five first input variables $x_0, x_1, x_2, x_3,$ and $x_4$ are given to the five nodes 41A, 41B, 41C, 41D, and 41E of the input layer 41, respectively.

The hidden layer 42 includes, for example, four nodes 42A, 42B, 42C, and 42D. In the example of FIG. 2, four second input variables $i_0, i_1, i_2,$ and $i_3$ are given to the four nodes 42A, 42B, 42C, and 42D of the hidden layer 42, respectively. As shown in FIG. 2(b), the four second input variables $i_0, i_1, i_2,$ and $i_3$ are represented by the matrix C with four rows and one column, and are calculated by a product BA of a matrix B with four rows and five columns representing 20 pieces of first weight data $\omega_{00}$ to $\omega_{34}$ and a matrix A with five rows and one column representing five first input variables $x_0$ to $x_4$. In the embodiment, although the hidden layer 42 is constituted of a single layer, the invention is not limited thereto, and the hidden layer 42 may be configured of a plurality of layers.

The output layer 43 includes, for example, three nodes 43A, 43B, and 43C. In the example of FIG. 2, three output values $y_0, y_1,$ and $y_2$ are given to the three nodes 43A, 43B, and 43C of the output layer 43, respectively. As shown in FIG. 2(c), the three output values $y_0, y_1,$ and $y_2$ are represented by the matrix E with three rows and one column and are calculated by a product DC of a matrix D with three rows and four columns representing 12 pieces of second weight data $w_{00}$ to $w_{23}$ and the matrix C with four rows and one column representing the four second input variables $i_0$ to $i_3$.

In the neural network 40 of FIG. 2, the second multiply-accumulate arithmetic unit 30 executes at least part of arithmetic processing executed by the second multipliers 33-1 and 33-2 and the second adders 34-1 and 34-2 in parallel with arithmetic processing executed by the first multiplier 13 and the first adder 14 of the first multiply-accumulate arithmetic unit 10.

Figure 3:
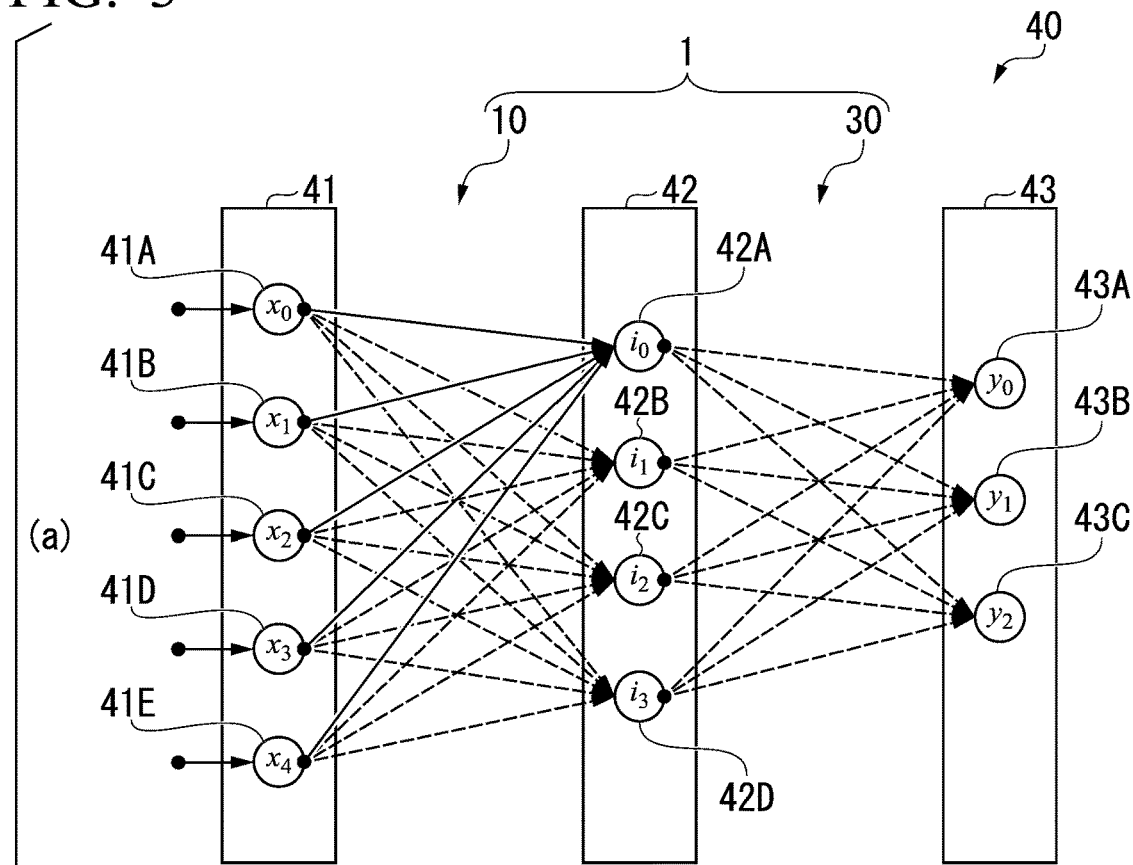
FIG. 3(a) is a diagram showing a flow of signals in a first stage in the neural network of FIG. 2.
FIG. 3(b) is a diagram showing an arithmetic operation of the first multiply-accumulate arithmetic unit in the flow of FIG. 3(a)
FIG. 3(c) is a diagram showing an arithmetic operation of the second multiply-accumulate arithmetic unit in the flow of FIG. 3(a).

Specifically, first, as shown in FIGS. 3(a) and 3(b), the first multiply-accumulate arithmetic unit 10 calculates the second input variable $i_0$ from five pieces of first weight data $\omega_{00}$ to $\omega_{04}$ and the five first input variables $x_0$ to $x_4$ in the hidden layer 42.

Figure 4:
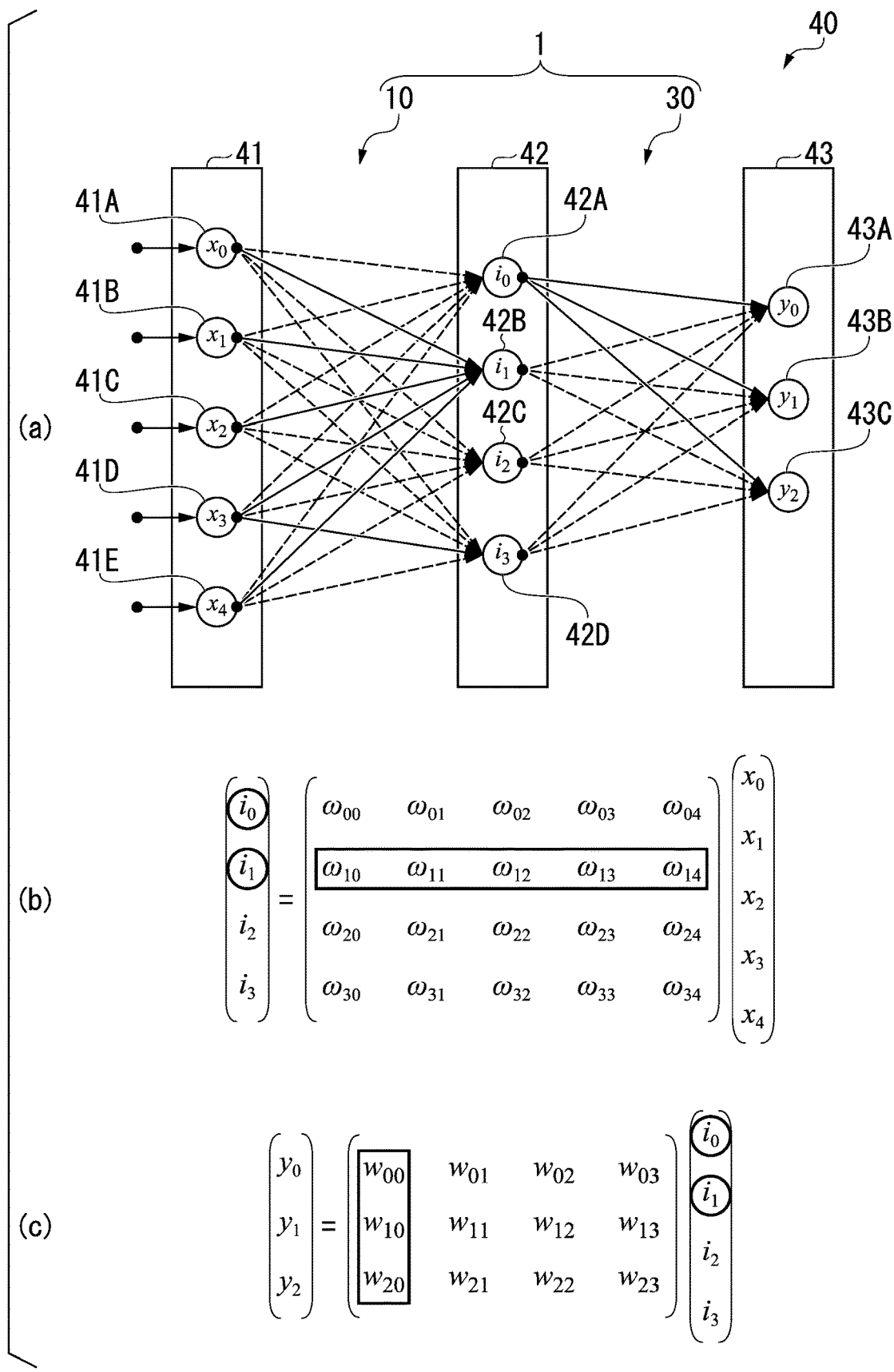
FIG. 4(a) is a diagram showing a flow of signals at a second stage in the neural network of FIG. 2.
FIG. 4(b) is a diagram showing an arithmetic operation of the first multiply-accumulate arithmetic unit in the flow of FIG. 4(a)
FIG. 4(c) is a diagram showing an arithmetic operation of the second multiply-accumulate arithmetic unit in the flow of FIG. 4(a).

Next, as shown in FIGS. 4(a) and 4(b), the first multiply-accumulate arithmetic unit 10 calculates the second input variable $i_1$ from the five pieces of first weight data $\omega_{10}$ to $\omega_{14}$ and the five first input variables $x_0$ to $x_4$ in the hidden layer 42, and as shown in FIG. 4(c), the second multiply-accumulate arithmetic unit 30 calculates products $w_{00}i_0$, $w_{10}i_0$, and $w_{20}i_0$ from three pieces of second weight data $w_{00}$, $w_{10}$, and $w_{20}$ and the second input variable $i_0$.

Figure 5:
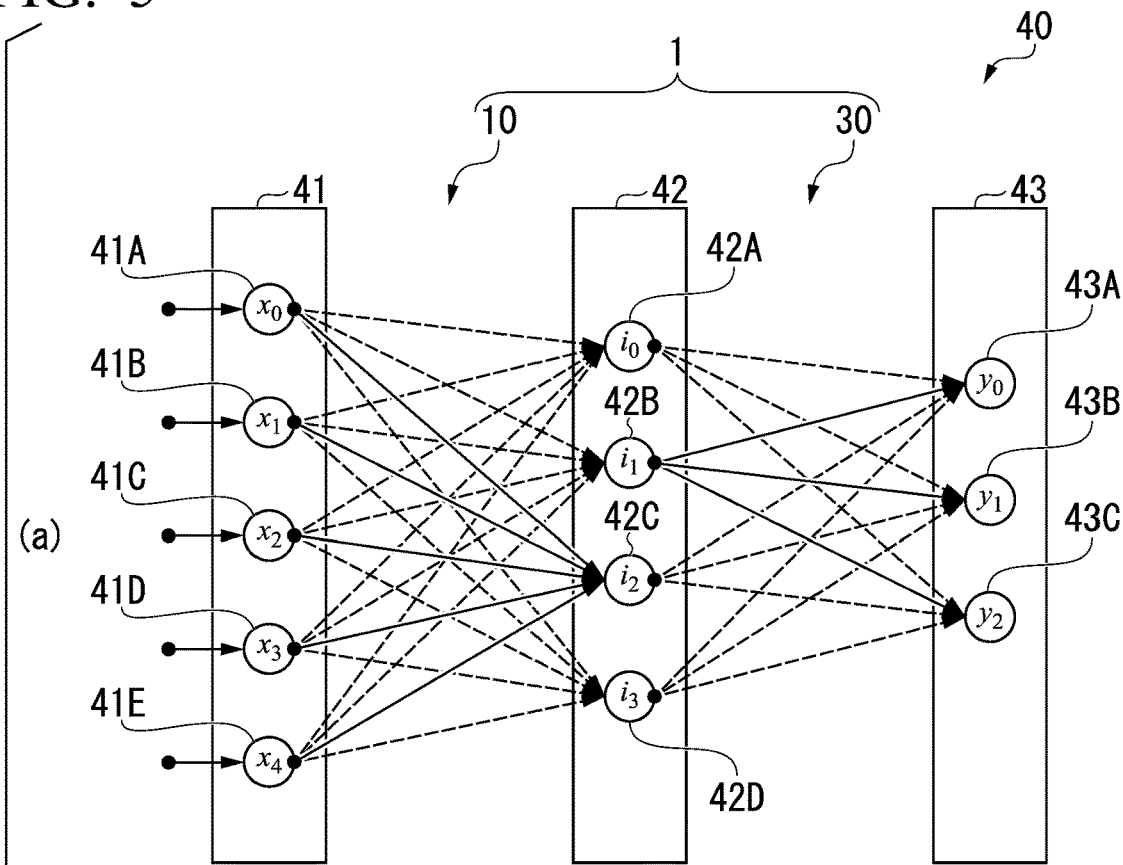
FIG. 5(a) is a diagram showing a flow of signals at a third stage in the neural network of FIG. 2.
FIG. 5(b) is a diagram showing an arithmetic operation of the first multiply-accumulate arithmetic unit in the flow of FIG. 5(a)
FIG. 5(c) is a diagram showing an arithmetic operation of the second multiply-accumulate arithmetic unit in the flow of FIG. 5(a).

Next, as shown in FIGS. 5(a) and 5(b), the first multiply-accumulate arithmetic unit 10 calculates the second input variable $i_2$ from five pieces of first weight data $\omega_{20}$ to $\omega_{24}$ and the five first input variables $x_0$ to $x_4$ in the hidden layer 42, and as shown in FIG. 5(c), the second multiply-accumulate arithmetic unit 30 calculates products $w_{01}i_1$, $w_{11}i_1$, and $w_{21}i_1$ from three pieces of second weight data $w_{01}$, $w_{11}$, and $w_{21}$ and the second input variable $i_1$.

Figure 6:
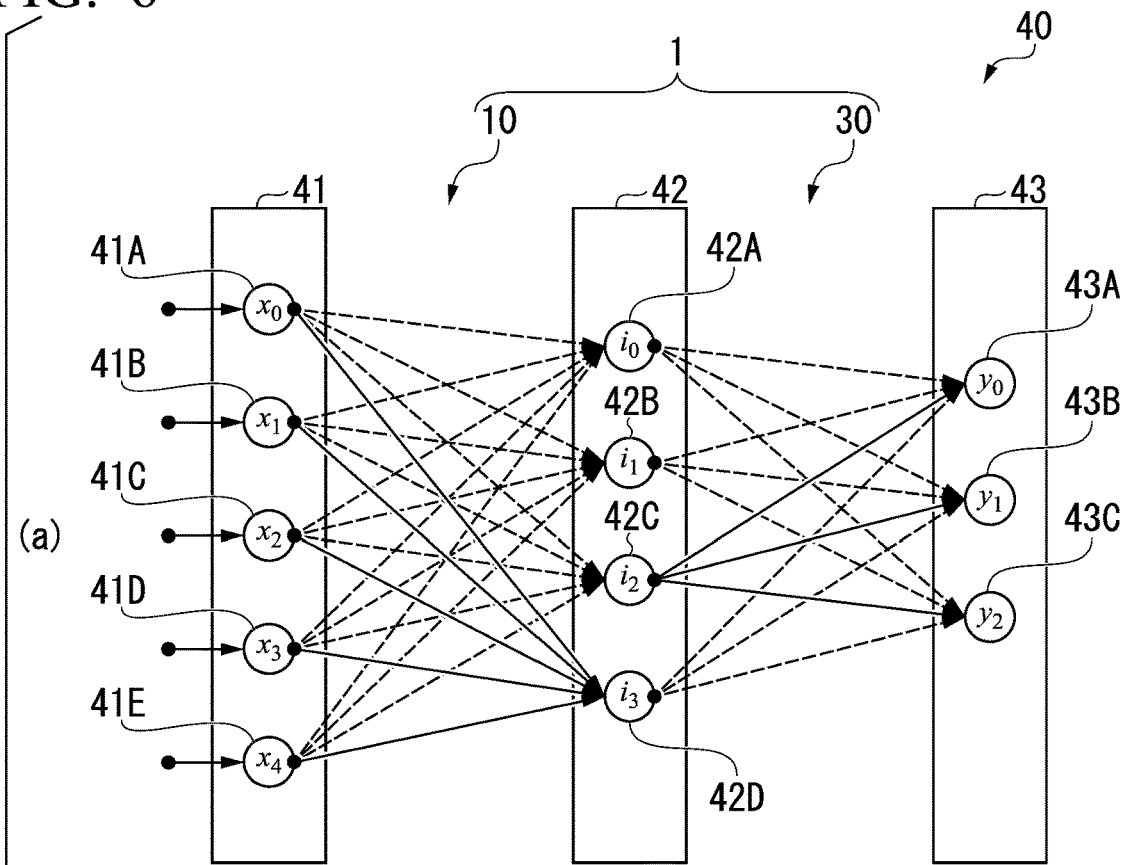
FIG. 6(a) is a diagram showing a flow of signal at a fourth stage in the neural network of FIG. 2.
FIG. 6(b) is a diagram showing an arithmetic operation of the first multiply-accumulate arithmetic unit in the flow of FIG. 6(a)
FIG. 6(c) is a diagram showing an arithmetic operation of the second multiply-accumulate arithmetic unit in the flow of FIG. 6(a).

Similarly, as shown in FIGS. 6(a) and 6(b), the first multiply-accumulate arithmetic unit 10 calculates the second input variable $i_3$ from five pieces of first weight data $\omega_{30}$ to $\omega_{34}$ and the five first input variables $x_0$ to $x_4$ in the hidden layer 42, and as shown in FIG. 6(c), the second multiply-accumulate arithmetic unit 30 calculates products $w_{02}i_2$, $w_{12}i_2$, and $w_{22}i_2$ from three pieces of second weight data $w_{02}$, $w_{12}$, and $w_{22}$ and the second input variable $i_2$.

Figure 7:
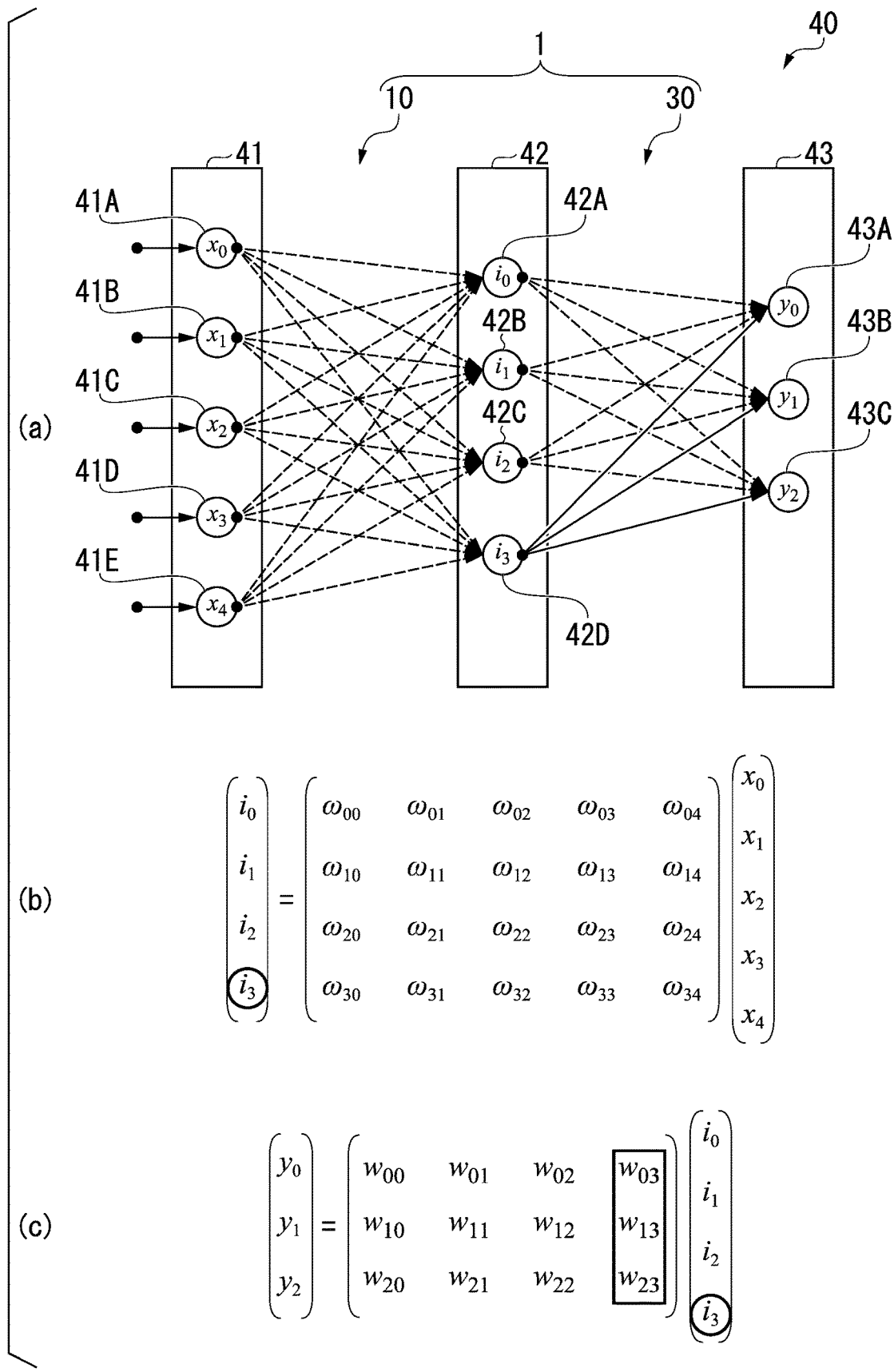
FIG. 7(a) is a diagram showing a flow of signals at a fifth stage in the neural network of FIG. 2.
FIG. 7(b) is a diagram showing an arithmetic operation of the first multiply-accumulate arithmetic unit in the flow of FIG. 7(a)
FIG. 7(c) is a diagram showing an arithmetic operation of the second multiply-accumulate arithmetic unit in the flow of FIG. 7(a).

Then, as shown in FIGS. 7(a) and 7(b), the second multiply-accumulate arithmetic unit 30 calculates products $w_{03}i_3$, $w_{13}i_3$, and $w_{23}i_3$ from three pieces of second weight data $w_{03}$, $w_{13}$, and $w_{23}$ and the second input variable $i_3$. With this, the three output values $y_0$, $y_1$, and $y_2$ are obtained. As the arithmetic processing of the first multiply-accumulate arithmetic unit 10 and the arithmetic processing of the second multiply-accumulate arithmetic unit 30 progress at the same period of time, a time until the output values $y_0$ to $y_2$ are obtained after the arithmetic processing of the second input variables $i_0$ to $i_3$ starts in the first multiply-accumulate arithmetic unit 10 is reduced. In particular, a time needed for the arithmetic processing is significantly reduced compared to a case where the arithmetic processing of the output values $y_0$ to $y_2$ is executed in the second multiply-accumulate arithmetic unit 30 after the arithmetic processing of the second input variables $i_0$ to $i_3$ ends in the first multiply-accumulate arithmetic unit 10.

Figure 8:
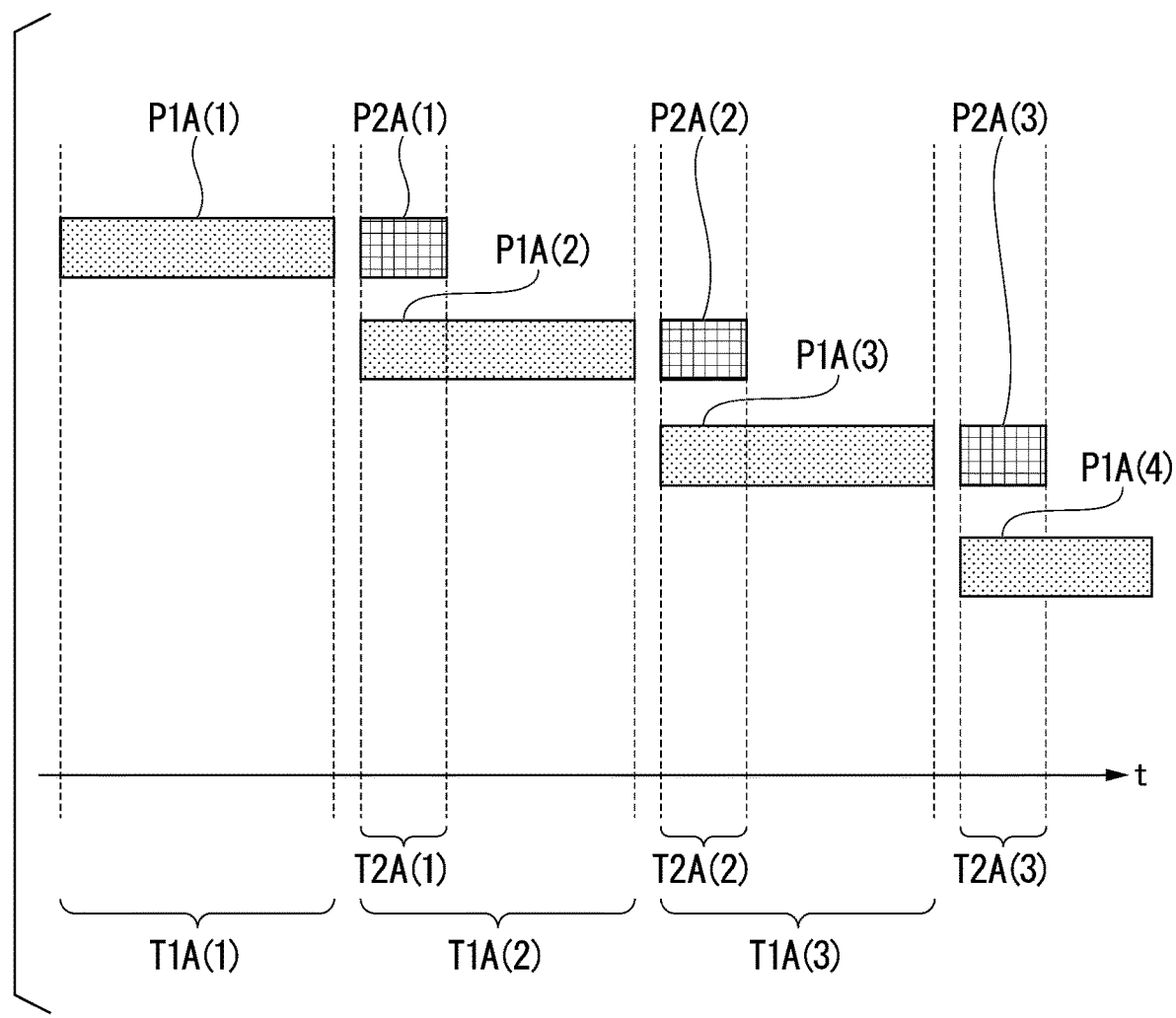
FIG. 8 is a diagram showing an example of a time chart of arithmetic processing that is executed by the first multiply-accumulate arithmetic unit in FIG. 2 and arithmetic processing that is executed by the second multiply-accumulate arithmetic unit in FIG. 2.

FIG. 8 is a diagram showing an example of a time chart of the arithmetic processing that is executed by the first multiply-accumulate arithmetic unit 10 in FIG. 2 and the arithmetic processing that is executed by the second multiply-accumulate arithmetic unit 30 in FIG. 2.

In FIG. 8, a case where the arithmetic processing that is executed by the first multiply-accumulate arithmetic unit 10 is divided into a first stage to an (m+1)th stage, and a plurality of kinds of arithmetic processing P1A(1), P1A(2), . . . , and P1A(n+1) (where n is an integer equal to or greater than 0) are executed in each stage. The arithmetic processing that is executed by the second multiply-accumulate arithmetic unit 30 is divided into a first stage to a (p+1)th stage, and a plurality of kinds of arithmetic processing P2A(1), P2A(2), . . . , and P2A(q+1) (where q is an integer equal to or greater than 0) are executed in each stage. In this case, the arithmetic processing P2A(1) that is executed by the second multiply-accumulate arithmetic unit 30 is executed in parallel with the arithmetic processing P1A(2) that is executed by the first multiply-accumulate arithmetic unit 10. The arithmetic processing P2A(2) that is executed by the second multiply-accumulate arithmetic unit 30 is executed in parallel with the arithmetic processing PlA(3) that is executed by the first multiply-accumulate arithmetic unit 10. Subsequently, similarly, arithmetic processing P2A (i) that is executed by the second multiply-accumulate arithmetic unit 30 is executed in parallel with arithmetic processing P1A(i+1) that is executed by the first multiply-accumulate arithmetic unit 10.

In the embodiment, the arithmetic processing P2A(i) that is executed by the second multiply-accumulate arithmetic unit 30 is started simultaneously with the arithmetic processing P1A(i+1) that is executed by the first multiply-accumulate arithmetic unit 10. A time T2A(i) needed for the arithmetic processing P2A that is executed by the second multiply-accumulate arithmetic unit 30 is shorter than a time T1A(i+1) needed for the arithmetic processing P1A that is executed by the first multiply-accumulate arithmetic unit 10. Accordingly, the arithmetic processing P2A(i) that is executed by the second multiply-accumulate arithmetic unit 30 ends before the arithmetic processing P1A(i+1) that is executed by the first multiply-accumulate arithmetic unit 10 ends.

In the embodiment, the whole of a processing time T2A(i) of the arithmetic processing P2A(i) that is executed by the second multiply-accumulate arithmetic unit 30 overlaps part of a processing time T1A(i+1) of the arithmetic processing P1A(i+1) that is executed by the first multiply-accumulate arithmetic unit 10. With this, a processing time is reduced by a sum $\Sigma T2A(i)$ of the total processing time needed for the arithmetic processing P2A(1), P2A(2), . . . , and P2A(q+1) compared to a case where the arithmetic processing P2A(1), P2A(2), . . . , and P2A(q+1) are executed in the second multiply-accumulate arithmetic unit 30 after the arithmetic processing P1A(1), P1A(2), . . . , and P1A(n+1) end in the first multiply-accumulate arithmetic unit 10.

The arithmetic processing P2A(i) that is executed by the second multiply-accumulate arithmetic unit 30 may overlap at least part of the arithmetic processing P1A(i+1) that is executed by the first multiply-accumulate arithmetic unit 10. The arithmetic processing P2A(i) that is executed by the second multiply-accumulate arithmetic unit 30 may be started simultaneously with the arithmetic processing P1A (i+1) that is executed by the first multiply-accumulate arithmetic unit 10, may be started before the arithmetic processing P1A(i+1) is started, or may be started after the arithmetic processing P1A(i+1) is started.

Figure 9:
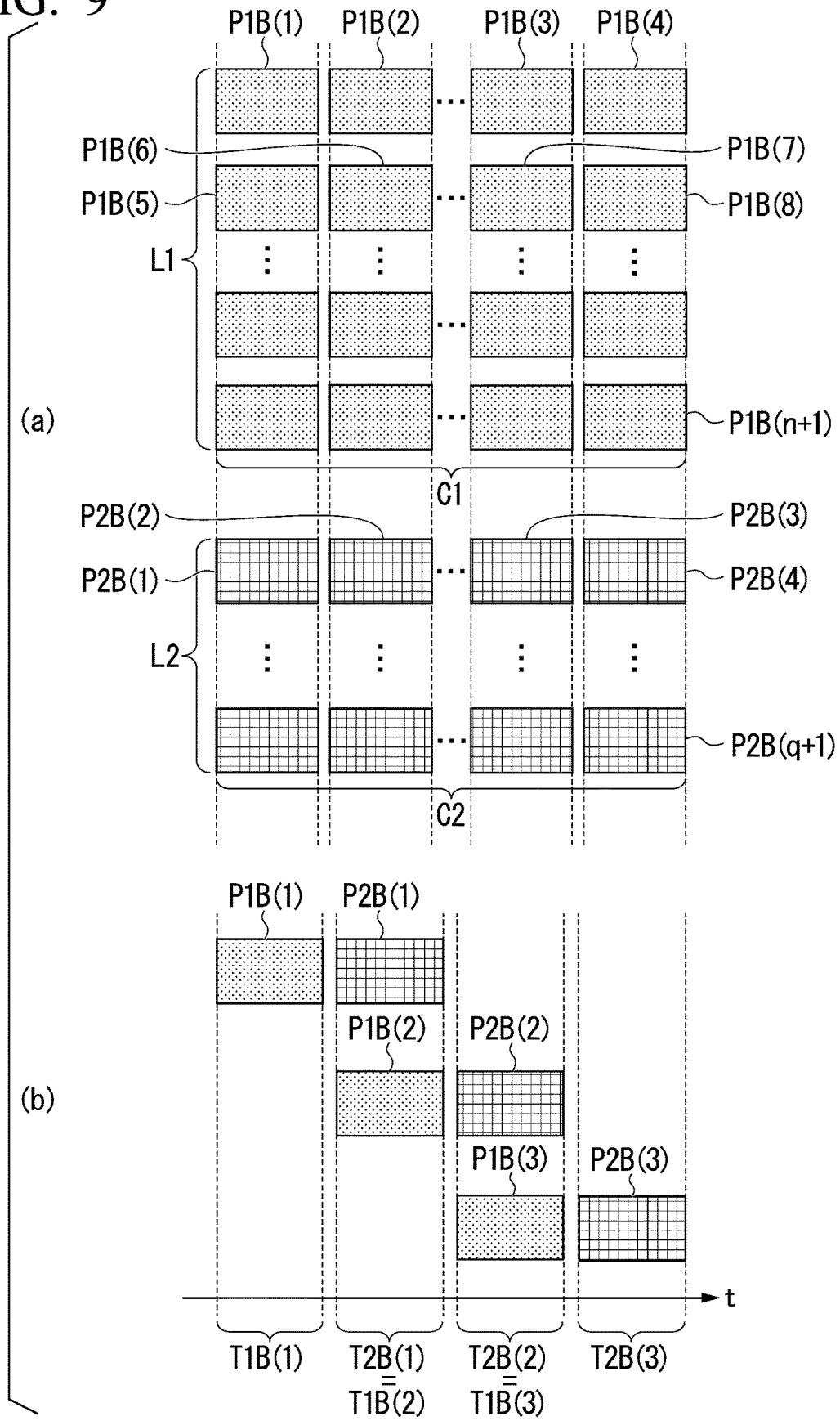
FIG. 9 (a) is a schematic view showing examples of the number of parallel arithmetic processing and the number of pipelines of arithmetic processing that is executed by the first multiply-accumulate arithmetic unit in FIG. 2 and the number of parallel arithmetic processing and the number of pipelines of arithmetic processing that is executed by the second multiply-accumulate arithmetic unit in FIG. 2.

FIG. 9(a) is a schematic view showing an example of the number of parallel arithmetic processing and the number of pipelines of arithmetic processing P1 that is executed by the first multiply-accumulate arithmetic unit 10 in FIG. 2 and an example of the number of parallel arithmetic processing and the number of pipelines of arithmetic processing P2 that is executed by the second multiply-accumulate arithmetic unit 30 in FIG. 2. FIG. 9(b) is a diagram showing a modification example of a time chart of the arithmetic processing P1 of the first multiply-accumulate arithmetic unit 10 and the arithmetic processing P2 of the second multiply-accumulate arithmetic unit 30 in FIG. 9(a).

As shown in FIG. 9(a), the number of arithmetic operations constituting arithmetic processing P1B that is executed by the first multiply-accumulate arithmetic unit 10 is (n+1) (where n is an integer equal to or greater than 0), and the number of arithmetic operations constituting arithmetic processing P2B that is executed by the second multiply-accumulate arithmetic unit 30 is (q+1) (where q is an integer equal to or greater than 0), the number of parallel arithmetic processing L1 of the arithmetic processing P1B that is executed by the first multiply-accumulate arithmetic unit 10 is a divisor of the number of arithmetic operations (n+1), and the number of parallel arithmetic processing L2 of the arithmetic processing P2B that is executed by the second multiply-accumulate arithmetic unit 30 is a divisor of the number of arithmetic operations (q+1). For example, the number of arithmetic operations of the arithmetic processing P1B is (n+1)=784, and the number of arithmetic operations of the arithmetic processing P2B is (q+1)=256, the number of parallel arithmetic processing L1 of the arithmetic processing P1B can be set to 49, and the number of parallel arithmetic processing L2 of the arithmetic processing P2B can be set to 16.

It is preferable that, in a case where the number of arithmetic operations of the arithmetic processing P1B is (n+1), and the number of arithmetic operations of the arithmetic processing P2B is (q+1), both of the number of pipelines C1 constituting the arithmetic processing P1B and the number of pipelines C2 constituting the arithmetic processing P2B are a common divisor of the number of arithmetic operations (n+1) and the number of arithmetic operations (q+1). As an example, in a case where the number of arithmetic operations of the arithmetic processing P1B is (n+1)=784, and the number of arithmetic operations of the arithmetic processing P2B is (q+1)=256, both of the number of pipelines C1 of the arithmetic processing P1B and the number of pipelines C2 of the arithmetic processing P2B can be set to 2, 4, 8, or 16 that is a common divisor of 784 and 256.

The number of pipelines (the length of the pipelines) is decided by the number of arithmetic operations of each of the arithmetic units and the number of arithmetic units. In this case, efficient computation can be performed that the number of arithmetic units is the divisor of the number of arithmetic operations. Efficient computation means that the arithmetic unit performs an arithmetic operation without stopping. Accordingly, as the numbers of pipelines C1 and C2 are set to the common divisor of the number of arithmetic operations (n+1) and the number of arithmetic operations (q+1), the lengths of the pipelines can be made uniform. For this reason, it is possible to improve the efficiency of the arithmetic processing P1B that is executed by the first multiply-accumulate arithmetic unit 10 and the efficiency of the arithmetic processing P2B that is executed by the second multiply-accumulate arithmetic unit 30.

It is preferable that, in a case where the number of arithmetic operations of the arithmetic processing P1B is (n+1), and the number of arithmetic operations of the arithmetic processing P2B is (q+1), both of the number of pipelines C1 constituting the arithmetic processing P1B and the number of pipelines C2 constituting the arithmetic processing P2B are a greatest common divisor of the number of arithmetic operations (n+1) and the number of arithmetic operations (q+1). As an example, in a case where the number of arithmetic operations of the arithmetic processing P1B is (n+1)=784, and the number of arithmetic operations of the arithmetic processing P2B is (q+1)=256, both of the number of pipelines C1 of the arithmetic processing P1B and the number of pipelines C2 of the arithmetic processing P2B can be set to 16 that is a greatest common divisor of 784 and 256.

With this, it is possible to improve the efficiency of the arithmetic processing P1B that is executed by the first multiply-accumulate arithmetic unit 10 and the efficiency of the arithmetic processing P2B that is executed by the second multiply-accumulate arithmetic unit 30, and to minimize a circuit scale.

It is preferable that a timing at which arithmetic processing P2B(i) that is executed by the second multiply-accumulate arithmetic unit 30 ends is adjusted to be the same as a timing at which arithmetic processing P1B(i+1) that is executed by the first multiply-accumulate arithmetic unit 10 ends. For example, as shown in FIG. 9(b), a processing time T2B(1) of arithmetic processing P2B(1) can be set to be the same as a processing time T1B(2) of arithmetic processing P1B(2). Similarly, a processing time T2B(i) of the arithmetic processing P2B(i) can be set to be the same as a processing time T1B(i+1) of the arithmetic processing P1B(i+1). With this, it is possible to achieve the best efficiency of the arithmetic processing P1B that is executed by the first multiply-accumulate arithmetic unit 10 and the best efficiency of the arithmetic processing P2B that is executed by the second multiply-accumulate arithmetic unit 30 and to further suppress an increase in circuit scale.

As described above, according to the embodiment, the neural network arithmetic processing device 1 calculates a plurality of products $\omega_{jk}x_i$ of the first input variables $x_i$ and the first weight data $\omega_{jk}$ and a plurality of sums $\Sigma\omega_{jk}x_i$ of the products $\omega_{jk}x_i$ (first arithmetic step), and holds a plurality of sums $\Sigma\omega_{jk}x_i$ calculated in the first arithmetic step as a plurality of second input variables $i_0, i_1, i_2, \ldots$, and $i_m$ (holding step). A plurality of products $w_{jk}i_i$ of the second weight data $\omega_{jk}$ and the second input variables $i_i$ are calculated and a plurality of sums $\Sigma w_{jk}i_i$ of the products $w_{jk}i_i$ are calculated (second arithmetic step), and a plurality of sums $\Sigma w_{jk}i_i$ calculated in the second arithmetic step are output as a plurality of output values $y_0, y_1, y_2, \ldots$, and $y_p$ (second output step). Then, at least part of the arithmetic processing that is executed in the second arithmetic step is executed in parallel with the arithmetic processing that is executed in the first arithmetic step. In this way, as parallel computation over the two layers of the hidden layer 42 and the output layer 43 is performed using both of the first multiply-accumulate arithmetic unit 10 and the second multiply-accumulate arithmetic unit 30, it is possible to implement a further increase in speed and efficiency of a multiply-accumulate arithmetic operation, to suppress an increase in circuit scale, and to perform the multiply-accumulate arithmetic operation with simple design.

Figure 10:
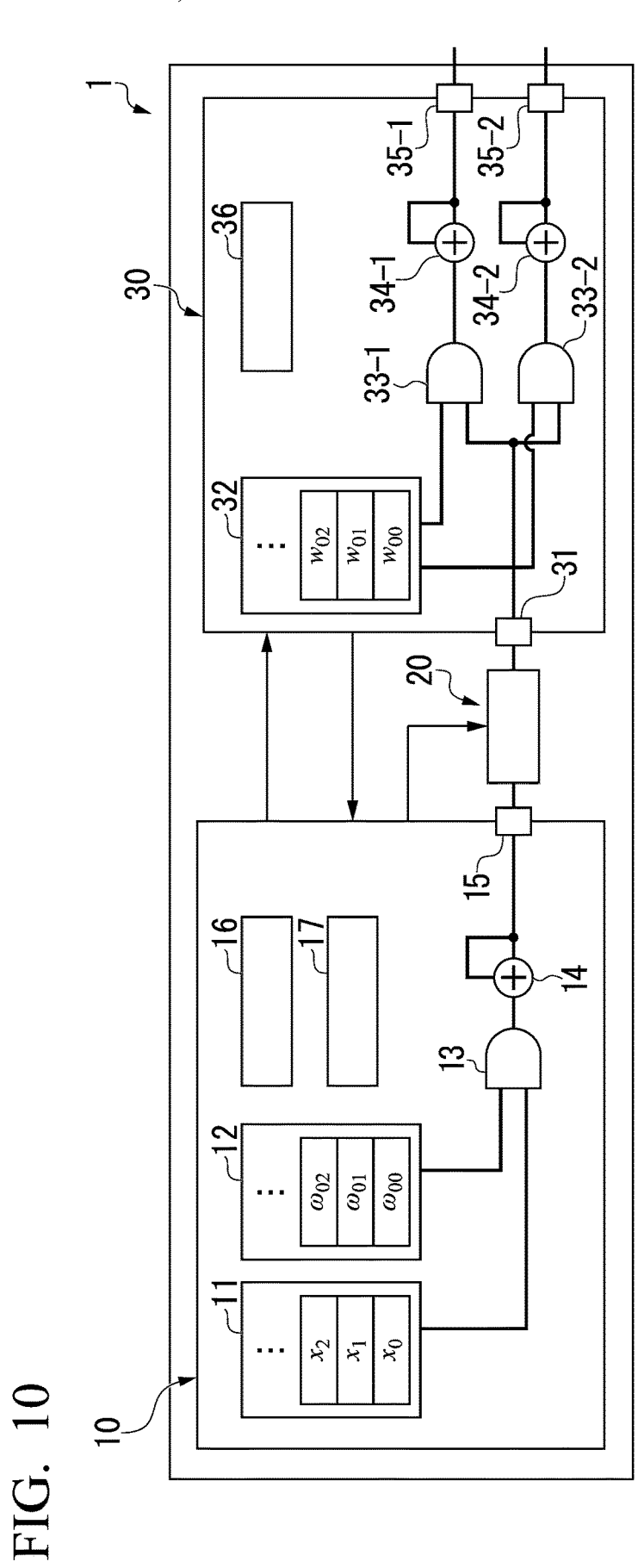
FIG. 10 is a schematic view showing a modification example of the configuration of the neural network arithmetic processing device of FIG. 1.

FIG. 10 is a schematic view schematically showing a modification example of the configuration of the neural network arithmetic processing device 1 of FIG. 1. The modification example is different from the above-described embodiment in that a control signal transmission unit is provided in both of the first multiply-accumulate arithmetic unit and the second multiply-accumulate arithmetic unit. The same configurations as in the above-described embodiment are represented by the same reference numerals as in the above-described embodiment, and description thereof will not be repeated. Different portions will be described below.

As shown in FIG. 10, the first multiply-accumulate arithmetic unit 10 further includes a first signal transmission and reception unit 16 that transmits a first control signal S1 to the second multiply-accumulate arithmetic unit 30 and receives a second control signal S2 from the second multiply-accumulate arithmetic unit 30, and a signal transmission unit 17 that transmits a third control signal S3 to the register 20. The second multiply-accumulate arithmetic unit 30 further includes a second signal transmission and reception unit 36 that transmits the second control signal S2 to the second multiply-accumulate arithmetic unit 30 and receives the first control signal S1 from the first multiply-accumulate arithmetic unit 10.

When the arithmetic processing of the first multiply-accumulate arithmetic unit 10 ends, the first signal transmission and reception unit 16 transmits, to the second multiply-accumulate arithmetic unit 30, the first control signal S1 notifying that the arithmetic processing of the first multiply-accumulate arithmetic unit 10 ends. When the arithmetic processing of the first multiply-accumulate arithmetic unit 10 ends, the signal transmission unit 17 transmits, to the register 20, the first control signal S3 notifying that the arithmetic processing of the first multiply-accumulate arithmetic unit 10 ends. In the modification example, although the first multiply-accumulate arithmetic unit 10 has the first signal transmission and reception unit 16 and the signal transmission unit 17, the invention is not limited thereto, and the first multiply-accumulate arithmetic unit 10 may have one signal transmission and reception unit that transmits the first control signal S1 to the second multiply-accumulate arithmetic unit 30, receives the second control signal S2 from the second multiply-accumulate arithmetic unit 30, and transmits the third control signal S3 to the register 20.

When the arithmetic processing of the second multiply-accumulate arithmetic unit 30 ends, the second signal transmission and reception unit 36 transmits, to the first multiply-accumulate arithmetic unit 10, the second control signal S2 notifying that the arithmetic processing of the second multiply-accumulate arithmetic unit 30 ends.

Figure 11:
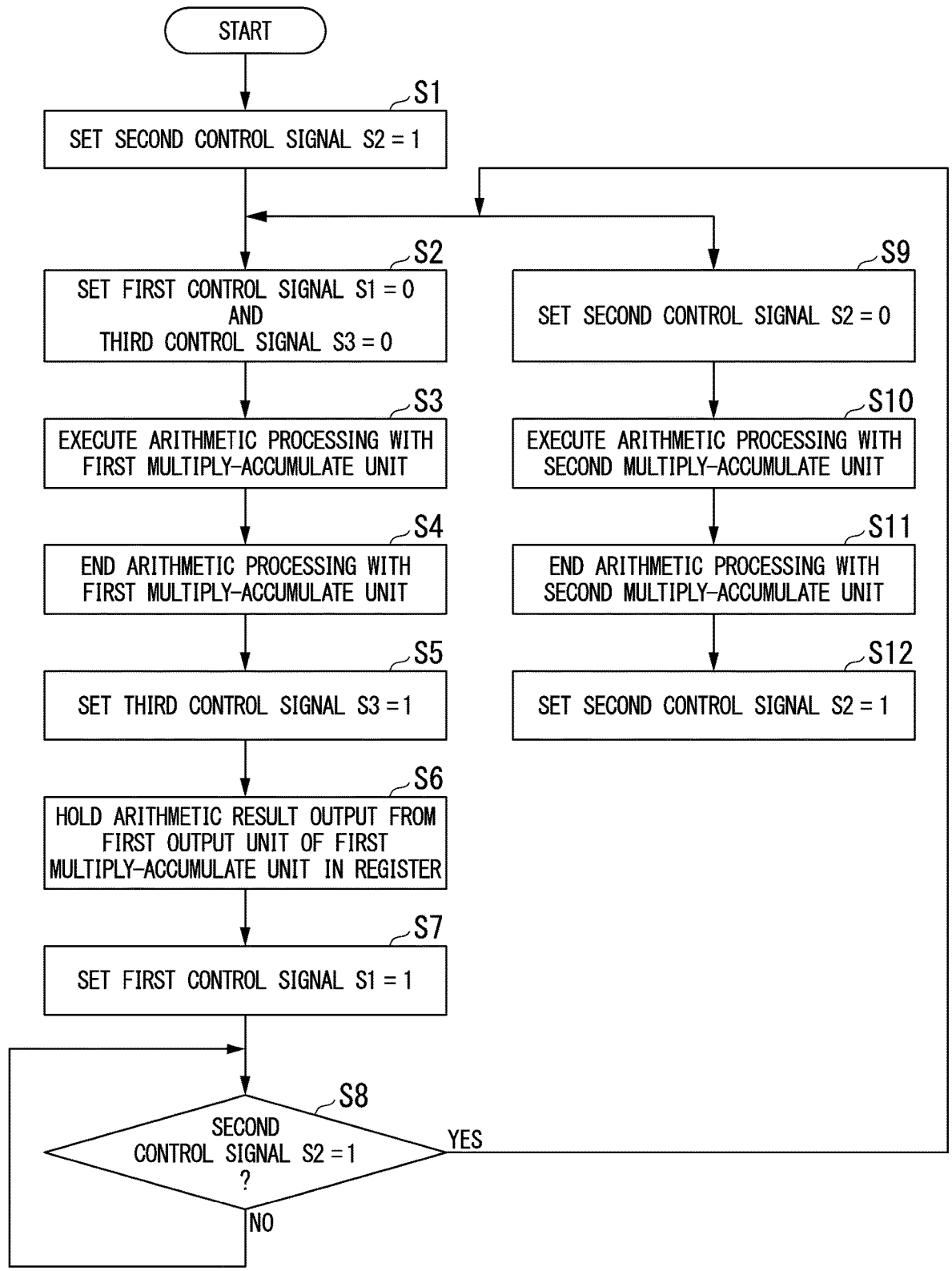
FIG. 11 is a flowchart showing an example of a neural network arithmetic processing method that is executed by the neural network arithmetic processing device of FIG. 10.

FIG. 11 is a flowchart showing an example of a neural network arithmetic processing method that is executed by the neural network arithmetic processing device 1 of FIG. 10.

In FIG. 11, first, the neural network arithmetic processing device 1 sets the second control signal S2 to 1, and the second multiply-accumulate arithmetic unit 30 transmits the second control signal S2 to the first multiply-accumulate arithmetic unit 10 (Step S1). Next, the neural network arithmetic processing device 1 sets the first control signal S1 to 0 and sets the third control signal S3 to 0 (Step S2). Next, the first multiply-accumulate arithmetic unit 10 executes the above-described arithmetic processing P1A(1) (Step S3), calculates the sum $\Sigma\omega_{0k}x_i$ of a plurality of products $\omega_{0k}x_i$ as the second input variable $i_0$, and ends the arithmetic processing P1A(1) (Step S4).

Thereafter, the neural network arithmetic processing device 1 sets the third control signal S3 to 1, and the first multiply-accumulate arithmetic unit 10 transmits the third control signal S3 to the second multiply-accumulate arithmetic unit 30 (Step S5). Thereafter, the first multiply-accumulate arithmetic unit 10 transmits the second input variables $i_0$ obtained by the arithmetic processing P1A(1) to the register 20 through the first output unit 15. The neural network arithmetic processing device 1 holds the arithmetic result (second input variables $i_0$) output from the first output unit 15 of the first multiply-accumulate arithmetic unit 10 in the register 20 (Step S6).

Next, the neural network arithmetic processing device 1 sets the first control signal S1 to 1, and the first multiply-accumulate arithmetic unit 10 transmits the first control signal S1 to the second multiply-accumulate arithmetic unit 30 (Step S7). Thereafter, the neural network arithmetic processing device 1 determines whether or not the second control signal S2 is set to 1 (Step S8), and when the second control signal S2 is set to 1, progresses to Steps S2 and S9.

Next, the neural network arithmetic processing device 1 sets the first control signal S1 to 0, sets the third control signal S3 to 0 (Step S2), and sets the second control signal S2 to 0 (Step S9). In this case, the first multiply-accumulate arithmetic unit 10 executes the above-described arithmetic processing P1A(2) (Step S3), and calculates the sums $\Sigma\omega_{1k}x_i$ of a plurality of products $x_i\omega_{1k}$ as the second input variables $i_1$. The second multiply-accumulate arithmetic unit 30 executes the arithmetic processing P2A(1) in parallel with the arithmetic processing of the first multiply-accumulate arithmetic unit 10 (Step S10), calculates a plurality of products $w_{j0}i_0$, $w_{j0}i_2$, $w_{j0}i_3$, . . . and $w_{p0}i_0$, and ends the arithmetic processing P2A(1) (Step S11). Thereafter, the neural network arithmetic processing device 1 sets the second control signal S2 to 1, and the second multiply-accumulate arithmetic unit 30 transmits the second control signal S2 to the first multiply-accumulate arithmetic unit 10 (Step S12).

Subsequently, the neural network arithmetic processing device 1 repeats the above-described processing, the first multiply-accumulate arithmetic unit 10 sequentially calculates the second input variables $i_2$, $i_3$, $i_4$, . . . , and $i_m$, and the second multiply-accumulate arithmetic unit 30 sequentially calculates a plurality of products $w_{j1}i_1$, $w_{j2}i_2$, $w_{j3}i_3$, . . . , and $w_{pq}i_m$ in parallel with the arithmetic processing of the first multiply-accumulate arithmetic unit 10. Then, in a case where the calculation of the second input variables $i_m$ is completed, the sums $\Sigma w_{0k}i_i$ of a plurality of products $w_{0k}i_i$ are output as the output values $y_0$ to the outside through at least one of the second output unit 35-1 or the second output unit 35-2. Similarly, the sum $\Sigma w_{1k}i_i$ of a plurality of products $i_iw_{1k}$, the sum $\Sigma w_{2k}i_i$ of a plurality of products $w_{2k}i_i$, . . . , and the sum $\Sigma w_{pk}i_i$ of a plurality of products $w_{pk}i_i$ are output as the output values $y_1$, $y_2$, . . . , and $y_p$, respectively, to the outside through at least one of the second output unit 35-1 or the second output unit 35-2.

In the modification example, as the parallel computation over the two layers of the hidden layer 42 and the output layer 43 is performed using the first control signal S1, the second control signal S2, and the third control signal S3, it is possible to implement a further increase in speed and efficiency of a multiply-accumulate arithmetic operation, to suppress an increase in circuit scale, and to perform the multiply-accumulate arithmetic operation with simple design.

Figure 12:
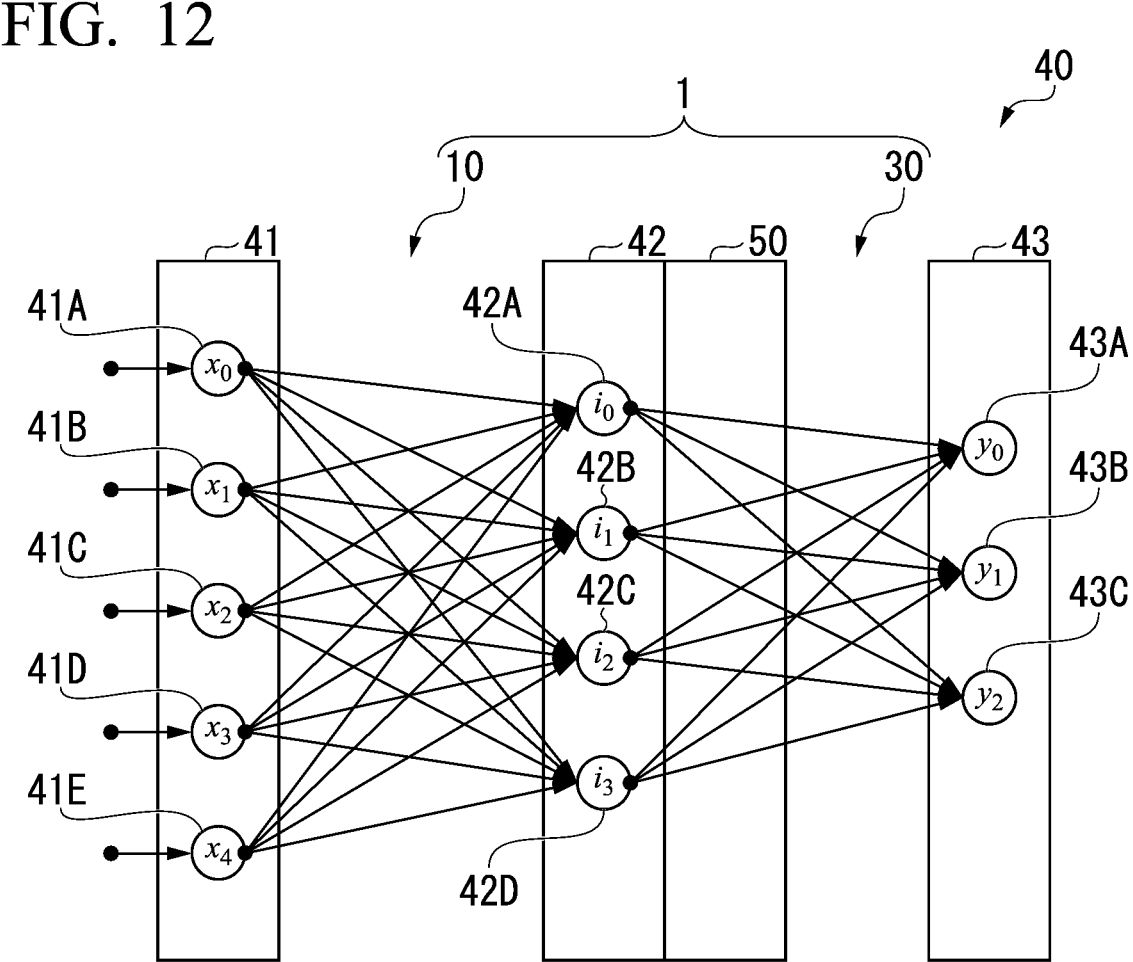
FIG. 12 is a schematic view schematically showing another modification example of the configuration of the neural network arithmetic processing device of FIG. 1.

FIG. 12 is a schematic view schematically showing another modification example of the configuration of the neural network arithmetic processing device 1 of FIG. 1.

As shown in FIG. 12, the neural network arithmetic processing device 1 may further include an activation function arithmetic processing unit 50 that is provided between the register 20 and the second multiply-accumulate arithmetic unit 30 to perform an arithmetic operation using an activation function. The activation function arithmetic processing unit 50 outputs a calculation result of an activation function f(i), for example, with the second input variables $i_2$, $i_3$, $i_4$, . . . , and $i_m$ as inputs to the second multiply-accumulate arithmetic unit 30. In the embodiment, the activation function f(i) is, for example, a logistic sigmoid function, a hyperbolic tangent function, a ReLU function, or an identity function.

The neural network arithmetic processing device 1 may include the activation function arithmetic processing unit between the first multiply-accumulate arithmetic unit 10 and the register 20. Alternatively, the activation function arithmetic processing unit may be provided between the first multiply-accumulate arithmetic unit 10 and the register and between the register 20 and the second multiply-accumulate arithmetic unit 30.

In this way, as the activation function f(i) is calculated using the second input variable $i_i$ by the activation function arithmetic processing unit 50, it is possible to execute high-accuracy arithmetic processing.

Figure 13:
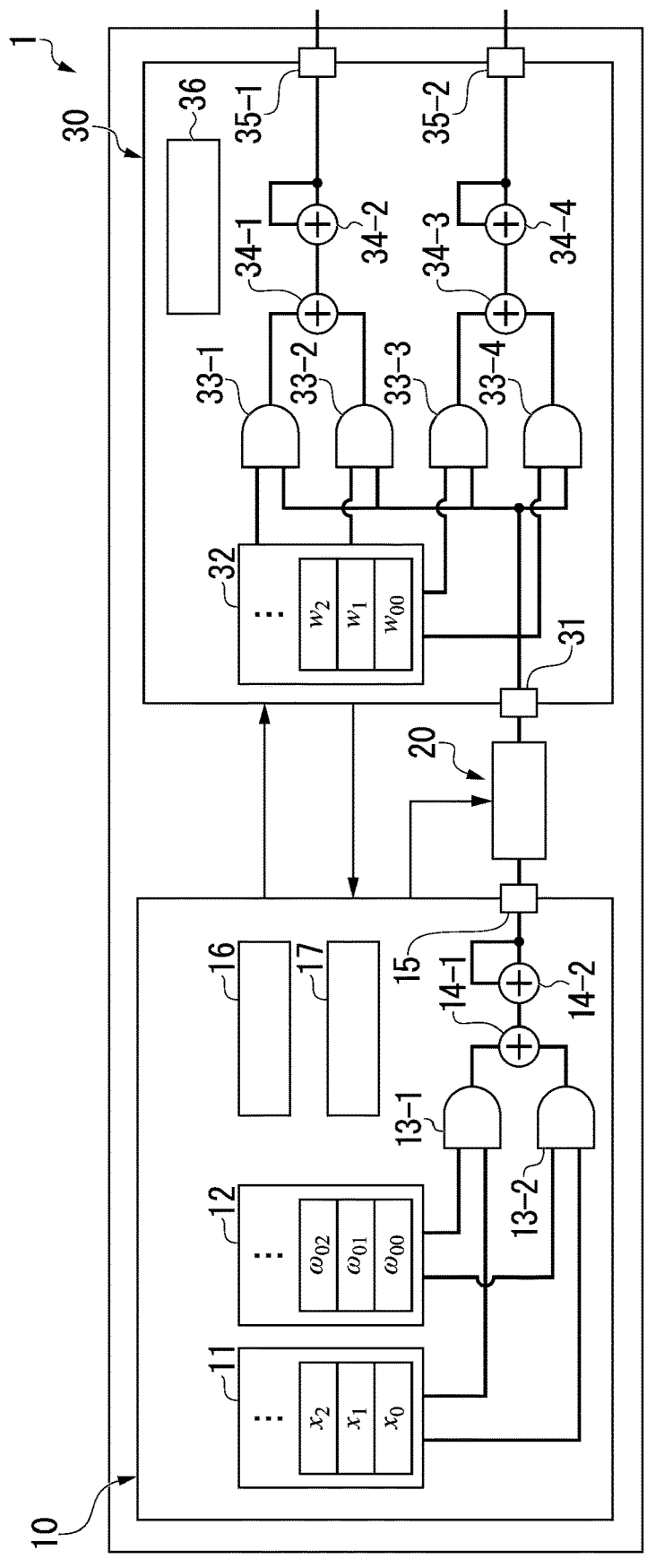
FIG. 13 is a schematic view schematically showing a modification example of the configuration of a first multiply-accumulate arithmetic unit and a second multiply-accumulate arithmetic unit in FIG. 10.

FIG. 13 is a schematic view schematically showing a modification example of the configuration of the first multiply-accumulate arithmetic unit 10 and the second multiply-accumulate arithmetic unit 30 in FIG. 10. The same configurations as in the above-described embodiment are represented by the same reference numerals as in the above-described embodiment, and description thereof will not be repeated. Different portions will be described below.

As shown in FIG. 13, the first multiply-accumulate arithmetic unit 10 may include first multipliers 13-1 and 13-2 that calculate a plurality of products of the first input variables and the first weight data, and first adders 14-1 and 14-2 that calculate a plurality of sums of the products multiplied by the two first multipliers 13-1 and 13-2.

According to the modification example, since the first multiply-accumulate arithmetic unit 10 includes a plurality of first multipliers, it is possible to increase the number of routes along which the first memory 11 or the second memory 12 and the first multiplier are connected. It is also possible to increase the amount of data of the first input variables read from the first memory 11 at a time, and to increase the amount of data of the first weight data read from the second memory 12 at a time. Therefore, it is possible to more efficiently execute the arithmetic processing.

Figure 14:
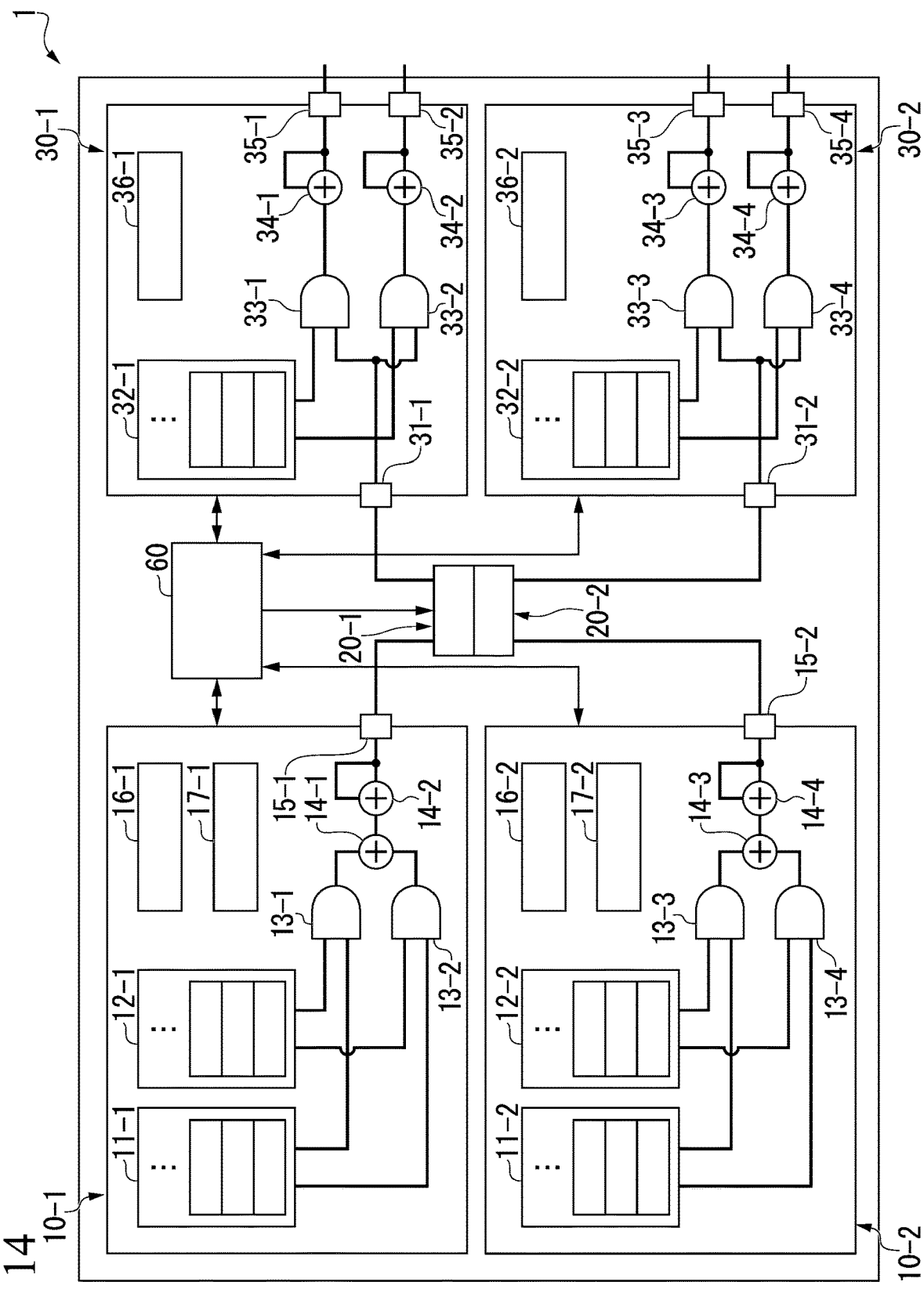
FIG. 14 is a schematic view schematically showing a modification example of the configuration of the neural network arithmetic processing device of FIG. 10.

FIG. 14 is a schematic view schematically showing a modification example of the configuration of the neural network arithmetic processing device 1 of FIG. 10. The same configurations as in the above-described embodiment are represented by the same reference numerals as in the above-described embodiment, and description thereof will not be repeated. Different portions will be described below.

As shown in FIG. 14, the neural network arithmetic processing device 1 may include first multiply-accumulate arithmetic units 10-1 and 10-2, registers 20-1 and 20-2 connected to the first multiply-accumulate arithmetic units 10-1 and 10-2, respectively, and second multiply-accumulate arithmetic units 30-1 and 30-2 connected to the registers 20-1 and 20-2, respectively.

The first multiply-accumulate arithmetic unit 10-1 includes a first memory 11-1, a second memory 12-1, first multipliers 13-1 and 13-2, first adders 14-1 and 14-2, a first output unit 15-1, a first signal transmission and reception unit 16-1, and a signal transmission unit 17-1. The first multiply-accumulate arithmetic unit 10-2 includes a first memory 11-2, a second memory 12-2, first multipliers 13-3 and 13-4, first adders 14-3 and 14-4, a first output unit 15-2, a first signal transmission and reception unit 16-2, and a signal transmission unit 17-2.

The second multiply-accumulate arithmetic unit 30-1 includes an input unit 31-1, a third memory 32-1, second multipliers 33-1 and 33-2, second adders 34-1 and 34-2, second output units 35-1 and 35-2, and a second signal transmission and reception unit 36-1. The second multiply-accumulate arithmetic unit 30-2 includes an input unit 31-2, a third memory 32-2, second multipliers 33-3 and 33-4, second adders 34-3 and 34-4, second output units 35-3 and 35-4, and a second signal transmission and reception unit 36-2.

The neural network arithmetic processing device 1 can further include a control signal repeater 60 between the first multiply-accumulate arithmetic unit 10-1 and the register 20-1 and between the first multiply-accumulate arithmetic unit 10-2 and the register 20-2. For example, the control signal repeater 60 receives a first control signal S1 from the first multiply-accumulate arithmetic unit 10-1 and transmits the first control signal 51 to one or both of the second multiply-accumulate arithmetic units 30-1 and 30-2. The control signal repeater 60 receives a first control signal S1 transmitted from the first multiply-accumulate arithmetic unit 10-2 and transmits the first control signal S1 to one or both of the second multiply-accumulate arithmetic units 30-1 and 30-2.

For example, the control signal repeater 60 receives a second control signal S2 transmitted from the second multiply-accumulate arithmetic unit 30-1 and transmits the second control signal S2 to one or both of the first multiply-accumulate arithmetic units 10-1 and 10-2. The control signal repeater 60 receives a second control signal S2 transmitted from the second multiply-accumulate arithmetic unit 30-2 and transmits the second control signal S2 to one or both of the first multiply-accumulate arithmetic units 10-1 and 10-2.

For example, the control signal repeater 60 receives the third control signal S3 transmitted from at least one of the first multiply-accumulate arithmetic unit 10-1 or the first multiply-accumulate arithmetic unit 10-2, and transmits the third control signal S3 to at least one of the register 20-1 or the register 20-2.

According to the modification example, since the neural network arithmetic processing device 1 includes a plurality of first multiply-accumulate arithmetic units, a plurality of registers, and a plurality of second multiply-accumulate arithmetic units, it is possible to more efficiently execute the arithmetic processing.

Although the embodiment of the invention has been described above in detail, the invention is not limited to the above-described embodiment, and various modifications and alterations can be made within the scope of the invention.

For example, a program for implementing the functions of each device (for example, the neural network arithmetic processing device 1) according to the above-described embodiment may be recorded on a computer-readable recording medium (storage medium), and the program recorded on the recording medium may be read into a computer system and executed to execute the processing.

The "computer system" used herein may include an operating system (OS) or hardware, such as peripheral equipment.

The "computer-readable recording medium" refers to a writable nonvolatile memory, such as a flexible disk, a magneto-optical disk, a read only memory (ROM), or a flash memory, a portable medium, such as a digital versatile disc (DVD), or a storage device, such as a hard disk incorporated in the computer system. The recording medium may be, for example, a recording medium that temporarily records data.

The "computer-readable recording medium" includes a medium that holds a program for a given time, such as a volatile memory (for example, a dynamic random access memory (DRAM)) in a computer system to be a server or a client in a case where a program is transmitted through a network, such as the Internet, or a communication circuit, such as a telephone circuit.

The above-described program may be transmitted from a computer system, in which the program is stored in a storage device or the like, to another computer system through a transmission medium or by a transmission wave in the transmission medium. Here, the "transmission medium" that transmits the program refers to a medium having a function of transmitting information, for example, a network (communication network), such as the Internet, or a communication circuit (communication line), such as a telephone circuit.

The above-described program may implement part of the above-described functions. The above-described program may be a differential file (differential program) that can implement the above-described functions in combination with a program stored in the computer system in advance.

In a computer, for example, a processor, such as a central processing unit (CPU), reads and executes a program stored in a memory.

BRIEF DESCRIPTION OF THE REFERENCE SYMBOLS

1: neural network arithmetic processing device
10: first multiply-accumulate arithmetic unit
10-1: first multiply-accumulate arithmetic unit
10-2: first multiply-accumulate arithmetic unit
11: first memory
11-1: first memory
11-2: first memory
12: second memory
12-1: second memory
12-2: second memory
13: first multiplier
13-1: first multiplier
13-2: first multiplier
13-3: first multiplier
13-4: first multiplier
14: first adder
14-1: first adder
14-2: first adder
14-3: first adder
14-4: first adder
15: first output unit
15-1: first output unit
15-2: first output unit
16: first signal transmission and reception unit
16-1: first signal transmission and reception unit
16-2: first signal transmission and reception unit
17: signal transmission unit
17-1: signal transmission unit
17-2: signal transmission unit
20: register
20-1: register
20-2: register
30: second multiply-accumulate arithmetic unit
30-1: second multiply-accumulate arithmetic unit
30-2: second multiply-accumulate arithmetic unit
31: input unit
31-1: input unit
31-2: input unit
32: third memory
32-1: third memory
32-2: third memory
33-1: second multiplier
33-2: second multiplier
33-3: second multiplier
33-4: second multiplier
34-1: second adder
34-2: second adder
34-3: second adder
34-4: second adder
35-1: second output unit
35-2: second output unit
35-3: second output unit
35-4: second output unit
36: second signal transmission and reception unit
36-1: second signal transmission and reception unit
36-2: second signal transmission and reception unit
40: neural network
41: input layer
41A: node
41B: node
41C: node
41D: node
41E: node
42: hidden layer
42A: node
42B: node
42C: node
42D: node
43: output layer
43A: node
43B: node
43C: node
50: activation function arithmetic processing unit
60: control signal repeater

The invention claimed is:

1. A neural network arithmetic processing device comprising:
at least one first multiply-accumulate arithmetic unit;
at least one register connected to the at least one first multiply-accumulate arithmetic unit; and
at least one second multiply-accumulate arithmetic unit connected to the at least one register,
wherein each of the at least one first multiply-accumulate arithmetic units has
a first memory that stores a plurality of first input variables,
a second memory that stores a plurality of pieces of first weight data,
at least one first multiplier that performs at least one multiply operation that calculates a plurality of products of the first input variables and the first weight data,
at least one first adder that performs at least one add operation that calculates a plurality of sums of the products multiplied by the at least one first multiplier, and
at least one first output unit that outputs the plurality of the sums added by the at least one first adder to the at least one register as a plurality of second input variables, and
each of the at least one second multiply-accumulate arithmetic units has
a third memory that stores a plurality of pieces of second weight data,
at least one second multiplier that performs at least one multiply operation that calculates a plurality of products of the second weight data and the second input variables held in the at least one register, at least one second adder that performs at least one add operation that calculates a plurality of sums of the products multiplied by the at least one second multiplier, and at least one second output unit that outputs the plurality of sums added by the at least one second adder as a plurality of output values, wherein each of the second memory and the third memory is a ring buffer memory.

2. The neural network arithmetic processing device according to claim 1, wherein at least part of the multiply and add operations to be executed by the second multiply-accumulate arithmetic units is executed in parallel with the multiply and add operations to be executed by the first multiply-accumulate arithmetic units.

3. The neural network arithmetic processing device according to claim 2, wherein, in a case where a number of the multiply and add operations constituting arithmetic processing P1 to be executed by the first multiply-accumulate arithmetic unit 10 is (n+1) (where n is an integer equal to or greater than 0), and a number of the multiply and add operations constituting arithmetic processing P2 to be executed by the second multiply-accumulate arithmetic unit is (q+1) (where q is an integer equal to or greater than 0), a number of parallel multiply and add operations L1 of the arithmetic processing P1 to be executed by the first multiply-accumulate arithmetic unit is a divisor of the number of arithmetic operations (n+1), and a number of parallel multiply and add operations L2 of the arithmetic processing P2 to be executed by the second multiply-accumulate arithmetic unit is a divisor of the number of arithmetic operations (q+1).

4. The neural network arithmetic processing device according to claim 3, wherein both of a number of pipelines C1 constituting the arithmetic processing P1 and a number of pipelines C2 constituting the arithmetic processing P2 are a common divisor of the number of arithmetic operations (n+1) and the number of arithmetic operations (q+1).

5. The neural network arithmetic processing device according to claim 4, wherein both of the number of pipelines C1 constituting the arithmetic processing P1 and the number of pipelines C2 constituting the arithmetic processing P2 are a greatest common divisor of the number of arithmetic operations (n+1) and the number of arithmetic operations (q+1).

6. The neural network arithmetic processing device according to claim 3, wherein a timing at which the arithmetic processing to be executed by the second multiply-accumulate arithmetic unit ends is the same as a timing at which the arithmetic processing to be executed by the first multiply-accumulate arithmetic unit ends.

7. The neural network arithmetic processing device according to claim 2, wherein the at least one first multiplier is a plurality of first multipliers, and the at least one first adder is a plurality of first adders.

8. The neural network arithmetic processing device according to claim 2, wherein the at least one second multiply-accumulate arithmetic unit is a plurality of the second multiply-accumulate arithmetic units, and the plurality of the second multiply-accumulate arithmetic units operate in parallel with the at least one first multiply-accumulate arithmetic unit.

9. The neural network arithmetic processing device according to claim 2, wherein the at least one first multiply-accumulate arithmetic unit is a plurality of the first multiply-accumulate arithmetic units, and the plurality of the first multiply-accumulate arithmetic units operate in parallel with the at least one second multiply-accumulate arithmetic unit.

10. The neural network arithmetic processing device according to claim 2, wherein the at least one first multiply-accumulate arithmetic unit is a plurality of the first multiply-accumulate arithmetic units, and the at least one second multiply-accumulate arithmetic unit is a plurality of the second multiply-accumulate arithmetic units, and the plurality of the first multiply-accumulate arithmetic units operate in parallel with the plurality of the second multiply-accumulate arithmetic units.

11. The neural network arithmetic processing device according to claim 1, further comprising:

at least one activation function arithmetic processing unit that is provided at the at least one first multiply-accumulate arithmetic unit and/or and the at least one second multiply-accumulate arithmetic unit and is located at least either between the at least one first multiply-accumulate arithmetic unit and the register or between the register and the at least one second multiply-accumulate arithmetic unit to perform an arithmetic operation using an activation function.

12. The neural network arithmetic processing deVice according to claim 1, wherein the at least one first multiply-accumulate arithmetic unit is a plurality of the first multiply-accumulate arithmetic units, and the at least one second multiply-accumulate arithmetic unit is a plurality of the second multiply-accumulate arithmetic units, and the plurality of the first multiply-accumulate arithmetic units operate in parallel with the plurality of the second multiply-accumulate arithmetic units.

* * * * *